(12) United States Patent
Chion et al.

(10) Patent No.: US 8,335,533 B2
(45) Date of Patent: Dec. 18, 2012

(54) TRUNKING AND PUSH-TO-TALK MECHANISMS FOR WCDMA WIRELESS COMMUNICATIONS

(75) Inventors: Mary Chion, Belle Mead, NJ (US); Yonggang Fang, San Diego, CA (US)

(73) Assignee: ZTE Corporation, Shenzhen (CN)

( * ) Notice: Subject to any disclaimer, the term of this patent is extended or adjusted under 35 U.S.C. 154(b) by 1209 days.

(21) Appl. No.: 11/110,373

(22) Filed: Apr. 19, 2005

(65) Prior Publication Data

US 2006/0003784 A1 Jan. 5, 2006

Related U.S. Application Data

(60) Provisional application No. 60/563,731, filed on Apr. 19, 2004.

(51) Int. Cl.
*H04B 7/00* (2006.01)
(52) U.S. Cl. ......... 455/519; 455/518; 455/520; 455/521
(58) Field of Classification Search .......... 455/516–521; 370/327, 340
See application file for complete search history.

(56) References Cited

U.S. PATENT DOCUMENTS

| | | | |
|---|---|---|---|
| 5,711,011 A | 1/1998 | Urs et al. | |
| 5,815,799 A | 9/1998 | Barnes et al. | |
| 5,867,491 A | 2/1999 | Derango et al. | |
| 5,917,823 A | 6/1999 | Benning et al. | |
| 6,049,528 A | 4/2000 | Hendel et al. | |
| 6,115,370 A | 9/2000 | Struhsaker et al. | |
| 6,128,301 A | 10/2000 | Bernstein | |
| 6,131,012 A | 10/2000 | Struhsaker et al. | |
| 6,138,011 A | 10/2000 | Sanders, III et al. | |
| 6,178,327 B1 | 1/2001 | Gomez | |
| 6,243,581 B1 | 6/2001 | Jawanda | |
| 6,249,681 B1 * | 6/2001 | Virtanen | 455/466 |
| 6,263,368 B1 | 7/2001 | Martin | |
| 6,292,671 B1 | 9/2001 | Mansour | |
| 6,373,829 B1 | 4/2002 | Vilmur | |
| 6,421,335 B1 | 7/2002 | Kilkki et al. | |
| 6,510,315 B1 | 1/2003 | Arnson | |
| 6,538,606 B2 | 3/2003 | Quinn et al. | |
| 6,553,234 B1 | 4/2003 | Florea | |
| 6,628,946 B1 * | 9/2003 | Wiberg et al. | 455/434 |
| 6,650,905 B1 | 11/2003 | Toskala et al. | |
| 6,738,617 B2 | 5/2004 | Rosen et al. | |
| 6,788,946 B2 | 9/2004 | Winchell et al. | |
| 6,862,453 B2 | 3/2005 | Collins | |
| 6,882,856 B1 | 4/2005 | Alterman et al. | |
| 6,898,436 B2 | 5/2005 | Crockett et al. | |

(Continued)

FOREIGN PATENT DOCUMENTS

EP 1 377 099 A1 1/2004

(Continued)

OTHER PUBLICATIONS

Dahlman et al., "WCDMA—The Radio Interface for Future Mobile Multimedia Communications," IEEE Transactions on Vehicular Technology, vol. 47, No. 4, pp. 1105-1118, Nov. 1998.

(Continued)

*Primary Examiner* — Raymond Dean
(74) *Attorney, Agent, or Firm* — Perkins Coie LLP

(57) ABSTRACT

Methods and systems for implementing trunking techniques in WCDMA systems for handling group calls and push-to-talk services.

40 Claims, 12 Drawing Sheets

U.S. PATENT DOCUMENTS

| | | | |
|---|---|---|---|
| 6,917,819 B2 | 7/2005 | Collins | |
| 6,947,752 B2 | 9/2005 | Collins | |
| 7,035,664 B2 | 4/2006 | Kim | |
| 7,254,119 B2 | 8/2007 | Jiang et al. | |
| 7,343,163 B1 | 3/2008 | Perkins et al. | |
| 7,453,837 B2 | 11/2008 | Jiang et al. | |
| 7,474,895 B1 | 1/2009 | Jiang et al. | |
| 7,492,788 B2 * | 2/2009 | Zhang et al. | 370/468 |
| 2001/0018342 A1 * | 8/2001 | Vialen et al. | 455/423 |
| 2002/0085516 A1 | 7/2002 | Bridgelall | |
| 2002/0152342 A1 | 10/2002 | Das et al. | |
| 2003/0050067 A1 | 3/2003 | Rozmaryn | |
| 2003/0050097 A1 | 3/2003 | Amirijoo et al. | |
| 2003/0065805 A1 | 4/2003 | Barnes, Jr. | |
| 2003/0133421 A1 | 7/2003 | Sundar et al. | |
| 2003/0134650 A1 | 7/2003 | Sundar et al. | |
| 2003/0134655 A1 | 7/2003 | Chen et al. | |
| 2003/0210664 A1 * | 11/2003 | Achour et al. | 370/329 |
| 2004/0042438 A1 * | 3/2004 | Jiang et al. | 370/342 |
| 2004/0100940 A1 * | 5/2004 | Kuure et al. | 370/349 |
| 2004/0116139 A1 * | 6/2004 | Yi et al. | 455/503 |
| 2004/0156340 A1 * | 8/2004 | Madour | 370/335 |
| 2004/0259556 A1 | 12/2004 | Czys | |
| 2005/0096062 A1 | 5/2005 | Ji et al. | |
| 2005/0117553 A1 * | 6/2005 | Wang et al. | 370/338 |
| 2005/0143107 A1 * | 6/2005 | Pattar et al. | 455/466 |
| 2005/0213530 A1 * | 9/2005 | Kuure et al. | 370/328 |
| 2006/0056361 A1 | 3/2006 | Jiang et al. | |
| 2006/0101291 A1 | 5/2006 | Jiang et al. | |
| 2009/0092116 A1 | 4/2009 | Jiang et al. | |

FOREIGN PATENT DOCUMENTS

| | | |
|---|---|---|
| WO | WO 00/74311 | 12/2000 |
| WO | WO 02/098073 | 12/2002 |
| WO | WO 03/101025 | 5/2003 |
| WO | WO 2004/017525 | 2/2004 |
| WO | 2005/101695 | 10/2005 |

OTHER PUBLICATIONS

Electromagnetic compatibility and Radio spectrum Matters (ERM); Code Division Multiple Access Public Access Mobile Radio (CDMA-PAMR); System reference document; ETSI TR 102 260 v1.1.1 (Dec. 2003), Technical Report, ETSI Standards, LIS, Sophia Antipolis Cedex, France, 58 pages.

European Examiner Enrico Pasini, Examination Report dated Apr. 24, 2009 for European Patent Application No. 05 746 265.7 (7 pages).

IEEE 802.16/2004, "IEEE Standard for Local and Metropolitan Area Networks, Part 16: Air Interface for Fixed Broadband Wireless Access Systems", Oct. 1, 2004, 895 pages.

IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1", Feb. 18, 2006, (864 pages).

International Search Report dated May 10, 2004 for PCT/US03/25003, filed Aug. 7, 2003, now WO 2004/17525, entitled "Trunking System for CDMA Wireless Communication," 3 pages.

\* cited by examiner

Common Trunking Message Link Protocol Stacks

Dispatching Server

Dispatching Client

BTS/BSC

Access Terminal

TRUNKING AND PUSH-TO-TALK MECHANISMS FOR WCDMA WIRELESS COMMUNICATIONS

This application claims the benefit of U.S. Provisional Application No. 60/563,731 entitled "TRUNKING AND PUSH-TO-TALK MECHANISMS FOR WCDMA WIRELESS COMMUNICATIONS" and filed Apr. 19, 2004, the entire disclosure of which is incorporated herein by reference as part of the specification of this application.

BACKGROUND

This application relates to wireless communication systems and techniques based on code division multiple access (CDMA) and wideband code division multiple access (WCDMA).

Wireless communication systems use electromagnetic waves to provide communication with and between mobile communication devices, such as mobile phones. In CDMA systems, a spread spectrum technique is used to allow multiple mobile wireless devices to simultaneously occupy the same frequency spectral range without interference with one another. The bandwidth of this common transmission spectral range is intentionally made much wider than the minimum required signal bandwidth in a communication system. The power of each subscribed mobile wireless device is spread over the wide bandwidth. The spreading results in a relatively low power spectral density and thus reduces the adverse interference to another narrow band signal occupying the same frequency range.

Direct sequence CDMA systems use different code sequences in the forward and reverse links for spectrum spreading. In the reverse link from a mobile device to the network, a transmission signal from each subscribed mobile wireless device in a CDMA system is modulated with a unique pseudo-noise (PN) binary sequence code, which is essentially orthogonal to any other PN sequence designated in the system. This modulation causes the spreading over a wide bandwidth. The orthogonality of different PN sequence codes allows for multiple access within the same frequency spectrum and makes CDMA systems less vulnerable to interference. One unique feature of CDMA systems is that no definite limit exists on the number of users in the system. In practice, the PN sequence codes may not be perfectly orthogonal and the noise caused by cross-correlation of the PN sequence codes can set an upper limit on the system capacity. In the forward link, a transmission signal from each base station to a subscribed mobile wireless device is modulated with a unique Walsh code and is further scrambled with a PN code.

Similar to other communication systems, CDMA systems can use trunking techniques to have a number of users to share a relatively small number of communication paths. This sharing of system resources can improve the system capacity and increase the efficiency in utilizing the system resource. However, the degree of sharing in a trunking system tends to be restricted, in at least one aspect, by the desired grade of service measured by the ability of a user to access a trunking CDMA system, especially during a high traffic period. Moreover, maintaining the privacy of each user's communication may also present a constraint on the degree of sharing in a CDMA trunking system. Hence, proper trunking system design and implementation are important in CDMA systems and are becoming even more so as CDMA systems are migrating from primarily narrowband digital voice communication services to addition of broadband packet data services.

WCDMA systems may be configured to provide the full high-speed wireless communication capacities of the third generation wireless communications under Universal Mobile Telecommunications System (UMTS) designs. WDCDMA may be implemented in various modes, including the multi-carrier mode such as 3GPP2 CDMA-2000, the direct spreading mode such as the frequency division duplex (FDD) under the 3GPP UTRA (Universal Terrestrial Radio Access) FDD, and the time division duplex (TDD) such as the 3GPPP UTRA TDD. The specification for UTRA R5.0 was published in October 2003 and a draft for revision R6.0 has been revised and modified.

SUMMARY

This application describes, among others, WCDMA trunking mechanisms based on a packet data model for allowing a number of users to share communication paths in systems such as UTRA systems. This sharing of system resources in WCDMA networks can improve the system capacity and increase the efficiency in utilizing the system resource. The WCDMA trunking techniques described here support group calls through one or more packet data networks (e.g., IP networks) in a WCDMA network. The examples described in this application provide mechanisms for ensuring fast connection time, allowing a large number of users in a group for group calls, and providing handoff mechanisms to ensure voice continuity in group calls. Notably, fast or instant access for group calls such as push-to-talk (PTT) services may be implemented in the present WCDMA trunking systems.

In one example, a method for providing group calls and sharing communication channels in the group calls in a WCDMA wireless communication system based on UTRA FDD is disclosed. One forward dedicated channel (DCH) is assigned per group member per sector in a group of members for group calls to carry signaling messages and power control information. All group members in a sector share one forward dedicated shared channel (DSCH) to carry user data.

In another example, a method is described to provide group calls and to share communication channels in the group calls in a WCDMA wireless communication system based on UTRA FDD. One forward broadcast channel (FACH) is shared by all group members per sector in a group to carry signaling messages. One forward dedicated channel (DCH) is shared by all group members per sector to carry user data. At least one common power control channel is shared by all group members to carry power control information.

In yet another example, a WCDMA communication system is disclosed to include a plurality of base transceiver stations spatially distributed to communicate with mobile communication devices via radio links, a plurality of radio network controllers (RNCs), each coupled to a plurality of base transceiver stations, a mobile switching center connected to couple said base station controllers to a public telephone network, and a data communication system comprising (1) a plurality of packet control function devices respectively connected to said base station controllers to transmit data packets to and from the mobile communication devices via said base transceiver stations, and (2) a serving GPRS support node (SGSN) connected to provide packet data services to the mobile communication devices; and a trunking system comprising (1) a plurality of dispatching clients respectively connected to said radio network controllers to transmit data packets of group calls to and from mobile communication devices of groups of subscribers where members of each group share a common trunking data link for transmission of data packets, and (2) at least one dispatching server connected to communicate with said dispatching clients, wherein said dispatching server and said dispatching clients are operable in combination to provide a push-to-talk function for a group call within each group.

A WCDMA communication system with a trunking mechanism to support PTT calls is also described. This system includes a WCDMA network having a mobile switching center connected to a public telephone switching network, operable to provide voice and data call services to mobile communication devices; a packet data system coupled to the WCDMA network to provide packet data services to the mobile communication devices; and a trunking system coupled to the WCDMA network and a packet data network to provide group call services to the mobile communication devices via the packet data network. This trunking system includes (1) a plurality of dispatching clients in communication with the WCDMA network to transmit data packets of a group call to and from mobile communication devices of a trunking group where members of each trunking group share a common trunking data link for transmission of data packets, and (2) a dispatching server connected to said packet data network and in communication with said dispatching clients to process group calls.

In implementing the trunking systems described above, one forward dedicated channel (DCH) is assigned per group member per sector in a group of members for group calls to carry signaling messages and power control information. All group members in a sector share one forward dedicated shared channel (DSCH) to carry user data.

The above trunking systems may also be implemented to assign one forward broadcast channel (FACH) to be shared by all group members per sector in a group to carry signaling messages, to assign one forward dedicated channel (DCH) to be shared by all group members per sector to carry user data, and to assign at least one common power control channel to be shared by all group members to carry power control information.

These and other features, system configurations, control techniques, associated advantages, and implementation variations are described in detail in the attached drawings, and the detailed textual description, and the claims.

DETAILED DESCRIPTION

Figure 1A:
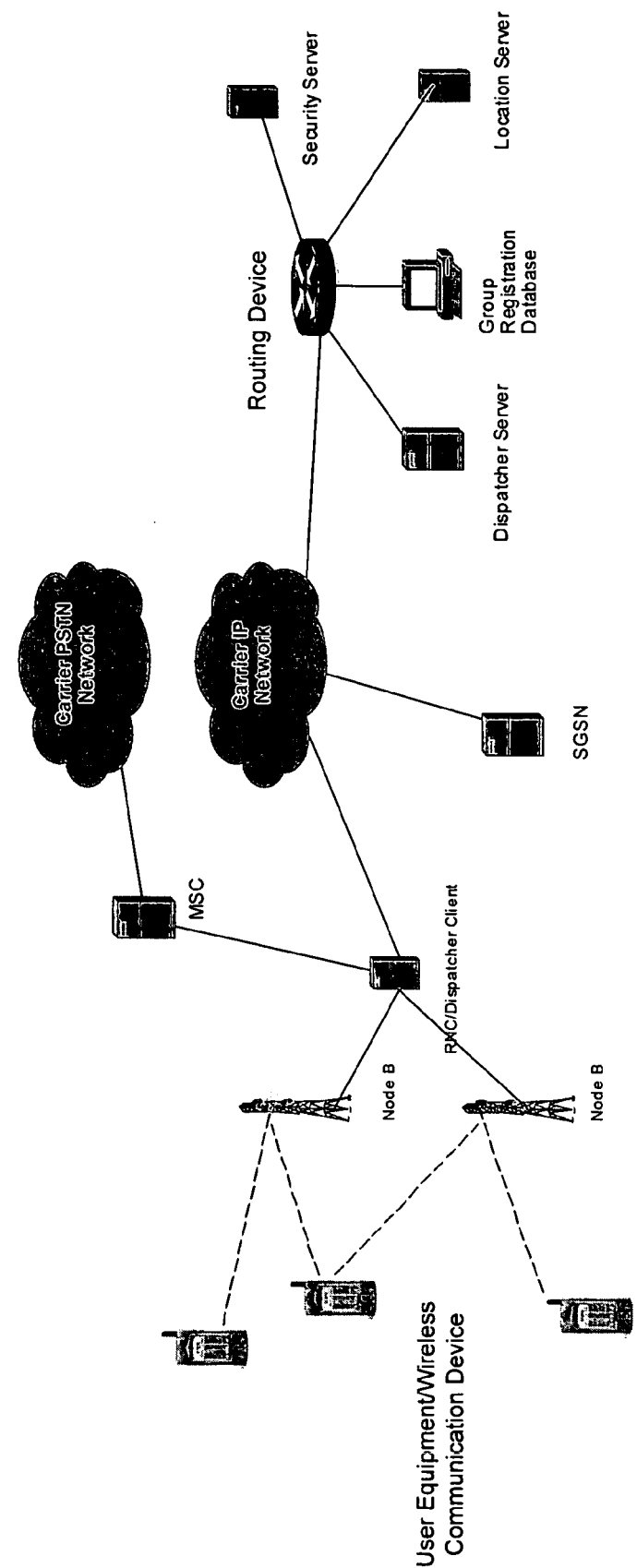
FIG. 1A shows an exemplary WCDMA communication system having an add-on trunking system for group calls.

FIG. 1A illustrates an exemplary WCDMA system implementing a trunking mechanism for group calls. This WCDMA system has a network wireless transceiver base stations or nodes "B" to form a radio access network through which wireless user equipments (UEs), mobile phones, computers, PDAs, or other suitable wireless communication devices access the WCDMA system. A network of radio network controllers (RNCs) are wired in communication with the nodes B, a mobile switching center (MSC) as a gateway to a carrier public switched telephone network (PSTN), and one or more packet data networks such as a carrier IP network illustrated in FIG. 1A. A serving GPRS support node (SGSN) is provided in communication with the carrier IP network in part to operate a switching center for data packets and in part to provide various services associated with the data packet services. A group registration database, a dispatcher server, a location server, and a security server may also be implemented for providing the sharing in the trunking and handling the group calls and PTT calls. Each RNC may be configured to include functions for a dispatcher client in managing and controlling group calls and PTT calls and may be physically integrated with a dispatcher as a single device.

Certain features in the exemplary trunking system shown in FIG. 1A are similar to features in trunking systems for CDMA2000 described in the referenced U.S. Provisional Application No. 60/563,731 and U.S. patent publication No. US2004/0042438A1 entitled "TRUNKING SYSTEM FOR CDMA WIRELESS COMMUNICATION" and published on Mar. 4, 2004 for U.S. patent application Ser. No. 10/313,943 which is incorporated herein by reference in its entirety as part of the specification of this application. For example, the system architecture in FIG. 1A has some similarities with the system architecture shown in FIG. 1 of the U.S. patent publication No. US2004/0042438A1. The RNC in FIG. 1A includes protocols of MAC (medium access control), RLC (radio link control), and RRC (radio resource control) to perform functions for the WCDMA trunking that are similar to functions of BSC and the dispatch client in CDMA2000 system in the U.S. patent publication No. US2004/0042438A1. Nodes B in FIG. 1A are analogous to the base transceiver stations (BTSs) in CDMA2000 systems. In addition, various signaling messages for PTT calls in the present WCDMA systems are similar to PTT signaling messages in CDMA2000 systems. Other features described in the U.S. patent publication No. US2004/0042438A1 may also be used in implementing PTT and other functions of group calls in WCDMA systems.

Briefly, the present WCDMA trunking systems may be configured to use the packet data model for PTT services. Header compression is used. The RLC may be set in the transparent mode for all user data. Different RRC states may be used to reduce the call setup times. The Direction Transfer Message may be used to carry PTT related signaling messages. Specific examples on air interface mechanisms are described here for implementing PTT calls in UTRA FDD systems. For example, two alternative options for implementing the forward data channel sharing are described. The described examples use UTRA FDD air interface channels and protocols which for implementing the PTT calls.

The present WCDMA trunking systems may be configured to allow for PTT services through a packet data networks in wireless communication systems such as systems based on WCDMA UTRA FDD standards. In one implementation, users in a group call group may share the air forward traffic channel in making PTT calls. Different RRC states may be used to transmit group call related signaling messages and reduce group call setup time.

The following sections will first describe the trunking mechanisms for CDMA systems such as CDMA2000 and then disclose implementations of trunking for WCDMA.

Features of CDMA systems described here include system architecture, channel configuration, group call processing, authentication, billing, trunking group management, system configurations, management, controls, and operations of trunking systems for handling group calls through one or more packet data networks in wireless communication systems such as systems based on CDMA2000 standards. The packet data network may be configured to operate based on a proper packet data protocol, such as a carrier network based on the Internet Protocol (IP). such a trunking system may include a dispatching client module coupled between a base station controller (BSC) and the packet data network to direct voice packets generated during a group call to or from a dispatching service node. The dispatching service node may be implemented to include, among others, a dispatching server module coupled to the packet data subsystem to manage and execute at least a portion of operations for the group call. This trunking system for handling the group calls may use a mechanism parallel to a packet data mechanism for handling the data packets via the same or a different packet data network. The packet data mechanism may include a packet control function (PCF) module and a packet data service node (PDSN) that are coupled between the BSC and the packet data network for transmitting the data packets.

The above and other trunking systems of this application may be configured to provide, e.g., fast or instant system access for group calls such as push-to-talk (PTT) services, high channel efficiency by having groups of users to share communication paths including both CDMA2000 traffic channels and packet data networks, adequate user security during a group call under the sharing architecture, and flexible grouping mechanism for easy formation, modification, and termination of user groups for group calls. The trunking techniques for group calls of this application may be designed to be fully compatible with existing CDMA air interface standards in part to allow CDMA service providers to add the trunking systems to the existing systems and thus to provide additional services without interfering other services. The usage efficiency of communication channels based on such trunking techniques may be significantly increased by properly reducing the transmission power for both the forward link and the reverse link in the group calls. Notably, the sharing may be implemented to allow users in a user group to share a single communication link.

Accordingly, one implementation of a CDMA system includes at least the following three parts: a CDMA network, a packet data system, and a trunking system. The CDMA network may include a mobile switching center connected to a public telephone switching network to provide voice and data call services to mobile communication devices. The packet data system is coupled to the CDMA network to provide packet data services to the mobile communication devices. The trunking system is also coupled to the CDMA network. In addition, the trunking system is connected to a packet data network to provide group call services to the mobile communication devices via the packet data network.

More specifically, the trunking system in the above implementation includes dispatching clients and a dispatching server. The dispatching clients are coupled in communication with the CDMA network to transmit data packets of a group call to and from mobile communication devices of a trunking group where members of each group share a common trunking data link for transmission of data packets. The dispatching server is connected to said packet data network to communicate with the dispatching clients.

In another implementation, a trunking method for providing group call services in a CDMA communication system may include the following operations. The dispatching clients are connected to a CDMA system to dispatch group call requests via a packet data network to a dispatching server that controls and manages group calls. A common trunking message link through the packet data network is used to transmit trunking messages between a dispatching client and the dispatching server. In addition, a single trunking data link to each trunking group is established between the dispatching server and each dispatching client such that part of or all of the group members share the single trunking data link in transmitting user data over the packet data network.

The trunking techniques and systems of this application may be used to efficiently handle group calls, add various user functions and services associated with the group calls, and provide control and management functions for service carriers. Such group calls are made by subscribed users with mobile or wireless communication devices including mobile phones, Personal Digital Assistants (PDAs), and mobile computers and are handled through one or more packet data networks in CDMA communication systems that allow for both voice and data communications, such as CDMA systems based on various CDMA2000 standards. Applicable CDMA2000 standards include, but are not limited to, CDMA2000 1X, CDMA2000 1xEV-DO, and CDMA2000 1xEV-DV. The trunking techniques and systems of this application may also be applied to other CDMA standards with packet data functions that are either evolved from CDMA2000 standards or are compatible with CDMA2000 standards.

The hardware infrastructure for implementing the trunking techniques of this application includes a range of devices and modules in a CDMA system, examples of which are added circuitry in user mobile communication devices, group call dispatching clients and servers associated with a packet data network, and others in the dispatching service node. Such trunking hardware infrastructure can be designed and implemented as add-ons to CDMA systems to provide additional functions and services and is fully compatible with other features of CDMA systems. Hence, the operations of the trunking systems do not interfere with other operations, functions, and features of CDMA systems. Accordingly, the corresponding trunking control and management software modules are implemented at various locations in the hardware infrastructure to manage and control the group calls and other associated functions and services.

Figure 1:
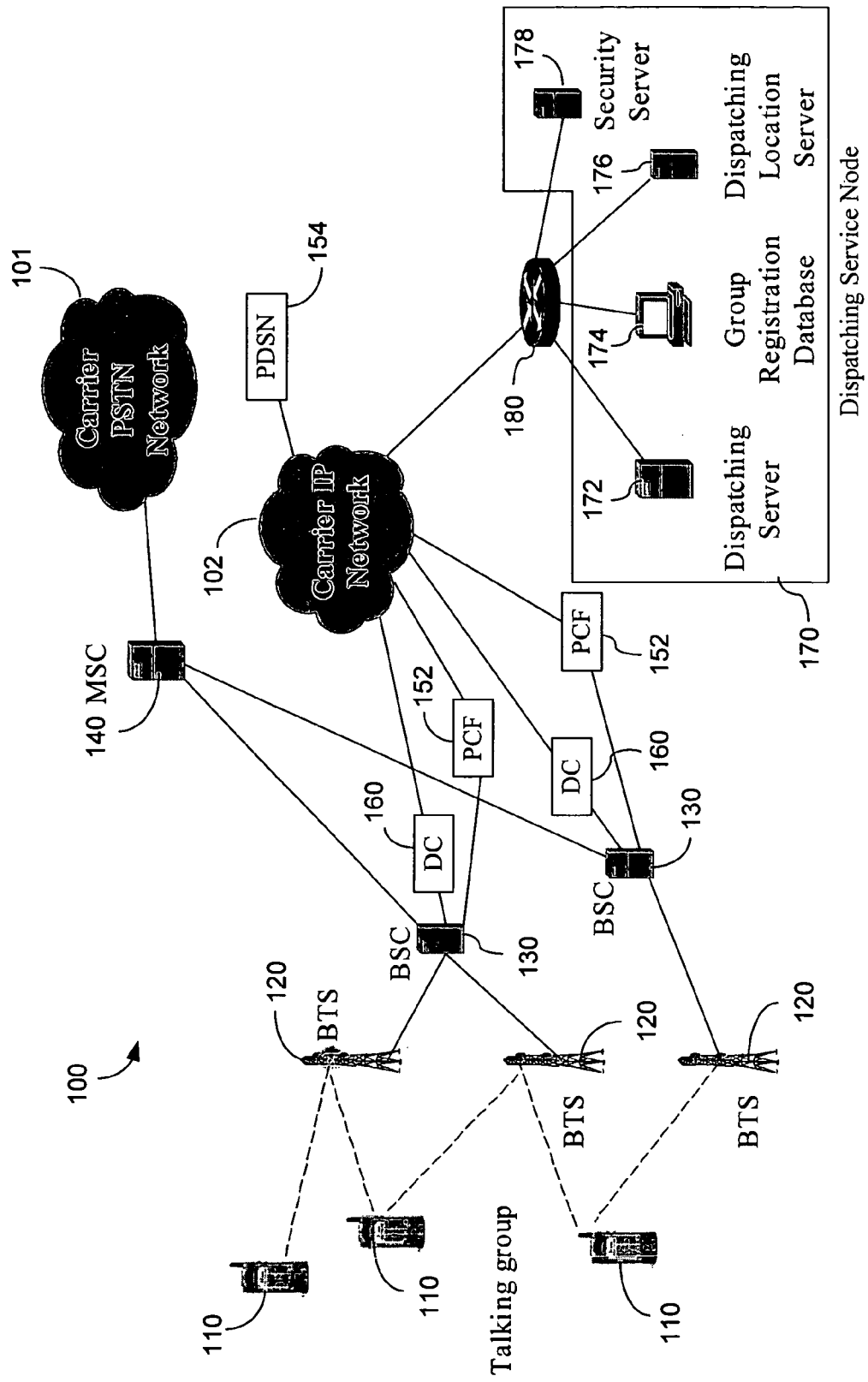
FIG. 1 illustrates a CDMA communication system 100 having an add-on trunking system for group calls according to one implementation of this application.

FIG. 1 illustrates a CDMA communication system 100 having an add-on trunking system for group calls according to one implementation of this application. Wireless mobile communication devices 110 of subscribed users in the system 100 receive and send communication signals for either or both of data and voice through base transceiver stations (BTSs) 120 over electromagnetic waves 112 in the air. The base transceiver stations 120 are distributed in a service area with multiple spatially divided cells to form a radio access network. Each cell may have one base transceiver station. Alternatively and more commonly for some CDMA systems, each base transceiver station 120 may be designed to have directional antennas and may be placed at a location on edges of multiple cells in a sectorized arrangement to cover these cells. A network of base station controllers (BSCs) 130 is connected, usually with wires or cables, to BTSs 120 for controlling the BTSs 120. Each BSC 130 is usually connected to two or more designated BTSs 120.

The next level up in the system 100 includes at least three communication control mechanisms connected between the BSCs 130 and two types of communication networks: one or more public switched telephone network (PSTN) 101 and one or more packet data networks 102. The first of the three control mechanisms includes at least one mobile switching center (MSC) 140 as a control interface between the BSCs 130 and the PSTN 101. To certain extent, the MSC 140 is essentially a switch that manages regular voice or data calls to and from the mobile devices 110 of subscribed users in the system 100. There may be one or more home location registers (HLRs) for storing permanent user profiles and visit location registers (VLRs) connected to the MSC 140 for storing temporary user profiles. The HLRs and VLRs are used to provide the MSC 140 with information on the subscribed users which may include tracking information on the locations of the users and their billing information. The Short Message Service (SMS) may also be provided through the MSC 140. The BTSs 120, the BSCs 130, and the MSC 140 form the basic CDMA network in connection with the PSTN network 101 to provide voice call and certain data services to the mobile devices 110.

The second of the three control mechanisms in the system 100 controls packet data services through the packet data network 102 such as an IP network. This control mechanism is illustrated to include packet control function (PCF) devices 152 and a packet data serving node (PDSN) 154 that are coupled to the basic CDMA network. Each PCF 152 can be connected between the BSC 130 and the PDSN 154 in general and may be integrated with the BSC 130 as a single device. The PDSN 154 may be generally configured to provide packet data communications over the radio access network and through the packet data network 102, and to execute functions for authentication, authorization, and accounting (AAA) through a connected AAA server. The basic functions of this mechanism and the MSC 140 are specified by CDMA2000 standards.

The third control mechanism in the system 100 constitutes part of the add-on trunking system for controlling and handling group calls and related functions and services through the packet data network 102. This mechanism includes dispatching clients 160 and a dispatching server 172 that are coupled to the basic CDMA network. Each dispatching client device 160 is connected between a corresponding BSC 130 and the dispatching server 172 through the packet data network 102. Like the PCF 152, the dispatching client 160 may be either a device separate from the BSC 130 or physically integrated with the BSC 130 as one module. As illustrated, the dispatching server 172 may be a part of a dispatching service node 170 to operate in combination with the dispatching clients 160 to control and manage the majority of the functions and services of the group calls in the trunking system. The dispatching service node 170 in this implementation may also include a group registration database 174, a dispatching location server 176, and security sever 178. A routing device 180, which may be implemented as part of the packet data networks 102, is connected to the dispatching service node 170 to operate as a switching interface to various devices within the node 170. The system 100 may include a single centralized dispatching service node 170 to serve all dispatching clients 160, or alternatively, use two or more distributed dispatching service nodes 170 to respectively cover different groups of dispatching clients 160.

This trunking system within the CDMA system 100 provides special services and controls for group calls made within designated trunking groups of subscribed users. A trunking group may be formed and defined by the subscribed users and may be changed in various ways by the group members. Examples of such trunking groups include members of an organization such as a government agency, a private company, a school or a department within a school, members of interest groups such as family members and relatives, friends, hobby groups, and others. Notably, the trunking system can be designed to assign a single trunking communication link to a group and all members of the group share that single link. This sharing increases the channel usage efficiency. A half-duplex radio system is generally used for the group calls to provide instant, effective, and private communications. Since the group calls are handled through the packet data network 102, the privacy of the data in group calls may be protected by user data encryption.

The BTSs 120, in addition to providing radio access for other services such as the full-duplex radio communication links for regular phone calls, can be controlled to provide the half-duplex radio links for the group calls and as an conduit to access the packet data network 102 through the BSCs 130 and the dispatching clients 160. Each dispatching client 160 is programmed with trunking control software to achieve the half-duplex radio communication for group calls, the access to the packet data network 102 for the group calls, and broadcast of forward link data to group members within BSC 130. The dispatching server 172 can be configured as the control center for the trunking system and operate to receive messages on group calls from various dispatching clients 160 as in the initial contact point for the group calls and to dispatch user data (e.g., voice packets) received from a reverse link to forward link. The voice packets may be duplicated and then the duplicated packets are dispatched on a forward link. The dispatching server 172 may also be programmed with an arbitration mechanism to arbitrate requests for the push-to-talk (PTT) from members in a group since a single half-duplex link is shared by all group members.

The general functions of other devices in the dispatching service node 170 may be configured to include the following features. The group registration database 174 stores group information including identification for groups and membership information of each group, and provides such group information to the dispatching server 172 for handling group calls. The dispatching location server 176 stores and updates information on locations of group members. The dispatching server 172 uses the location information and the group information for setting up a group call. In an alternative implementation, the dispatching location server 176 may be combined with the group registration database 174 as a single module in the node 170. The dispatching location server 176 records duplicated location information sent by the BSC 130 to the MSC 140 and operates to speed up the setup process of the group calls. When the BSC 130 sends RegistrationRequest or Location UpdateRequest to MSC 140, the BSC duplicates the messages and sends the duplication to the server 176. The server 176 may record the following information: group ID, group member ID, mobile IMSI, CellID, LocationAreaID, and Slot_Cycle_Index. The server 176 may be located with the node 170 as separate device connected to the packet data networks 102 as shown, or integrated with either of the server 172 or the database 174. The security server 178 authenticates and authorizes the membership of each group and screens out access to group calls by subscribed users outside groups.

The above trunking system infrastructure allows the system 100 to fully comply with CDMA2000 standards and to add group call features with both service control and user functions. Examples of the group call features include, for example, operational control, system services, user control services such as calling privileges and connection confirmation tone, user services such as group speed dials and group call waiting and forward.

As illustrated in FIG. 1, a single dispatching service node 170 with one dispatching server 172 may be connected to multiple dispatching clients 160 via the packet data network 102. The dispatching service areas for group calls may be divided into local dispatching service areas and global dispatching service areas. A local dispatching service area may be a relatively small geographic region such as a city, town, or a specified urban area. A local dispatching service area can be larger than the coverage areas of a MSC 140 or PDSN 154. A single dispatching service node may be sufficient to serve a local dispatching service area. A global dispatching area generally involves greater geographic areas where a single dispatching server is insufficient for handling all group calls. Hence, multiple dispatching servers within the network are designed to respectively handle group calls in different smaller service areas. The dispatching servers may be connected by the packet data network 102 and need a special connection among dispatching servers. Such a global dispatching service area may be a worldwide CDMA area.

Notably, a secured connection is established between a dispatching server 172 and its subordinate dispatching clients 160. This can reduce the latency delay in the packet data networks 102 which may be an IP network. In the implementation shown in FIG. 1, a PDSN 154 is intentionally not placed in the communication route between the dispatching sever 172 and each client 160 to further reduce the latency delay. The signaling interfaces between the BSC 130 and the dispatching client 160 may use the same A8/A9 interfaces between BSC-130 and PCF 152 where the A8 interface provides a path for user traffic for voice packets in the group calls and A9 interface provides the corresponding signaling connection. Similarly, the A10 interface, which is conventionally used between PCF 152 and the PDSN 154, is used here to provide a path for user traffic between the client 160 and the server 172; the A11 interface, which is also conventionally used between PCF 152 and the PDSN 154, is used here to provide a signaling connection between the client 160 and the server 172. One advantage of this A8/A9 and A10/A11 design is that PCF and PDSN hardware may be used for the dispatching clients and servers but programmed with special trunking software for handling the group calls. Another advantage of this design is to provide the flexibility in the network configuration to allow for integration of trunking services with the normal packet data services, or separation of the trunking services from existing packet data networks to reduce latency caused by normal packet data services. However, it should be understood that suitable link interfaces other than A8/A9 and A10/A11 may be used for signaling connections between the dispatching client 160 and the BSC 130 and between the dispatching client 160 and the dispatching server 172.

Figure 2:
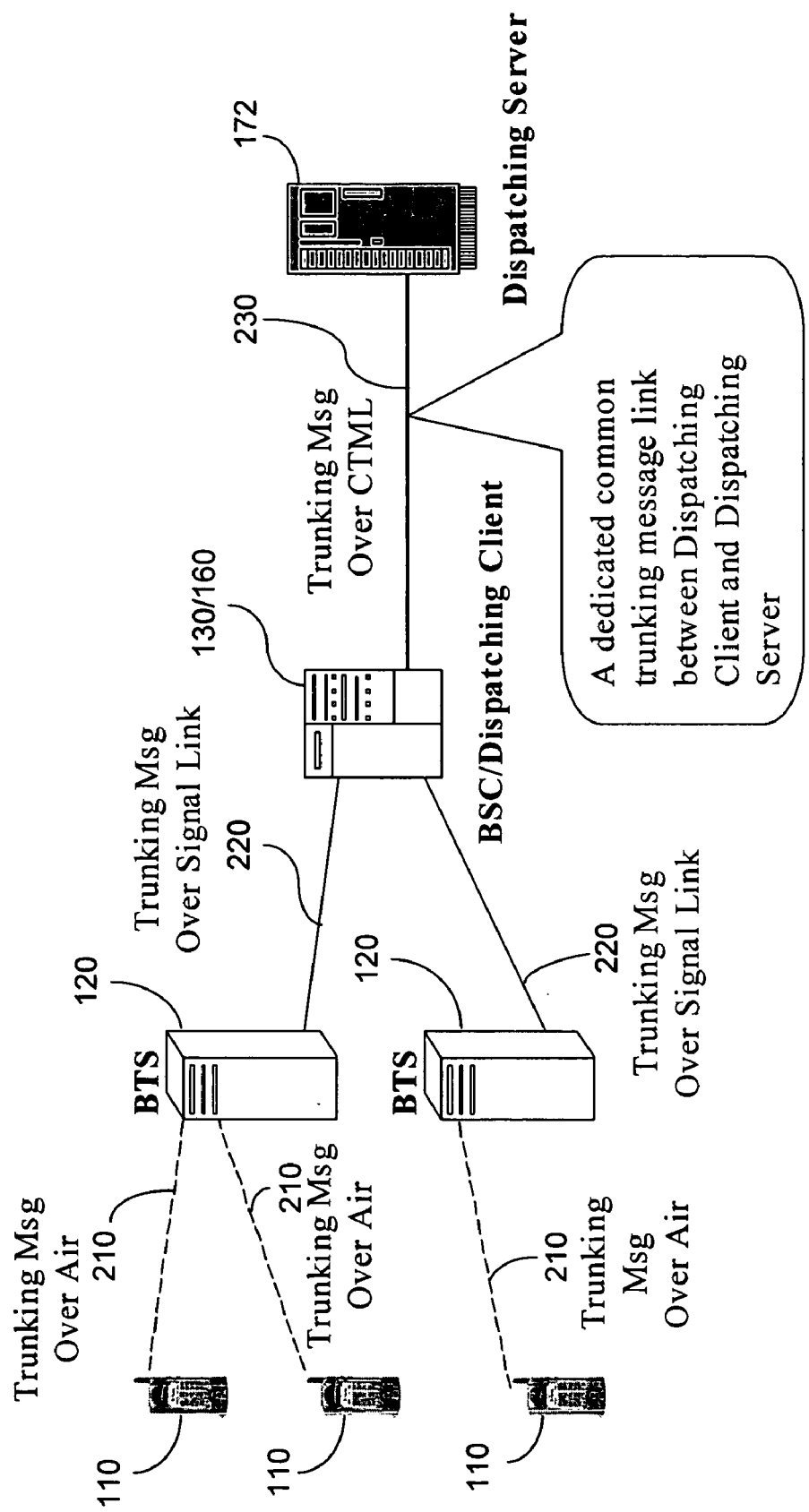
FIG. 2 shows a dedicated common trunking message link (CTML) used between the dispatching client and the dispatching server in the trunking system in FIG. 1 according to one exemplary implementation.

Another feature of the present trunking system is the implementation of a common channel signaling mechanism for handling trunking messages over the packet data networks 102. A voice frame link sharing is also provided for the forward link user data. FIG. 2 illustrates this feature where the link 210 between the user communication device or mobile station 110 and the BTSs 120 is the air radio channel for carrying the trunking messages, the link 220 between the BTS 120 and the BSC 130 is wired link for carrying the trunking messages, and a dedicated common trunking message link (CTML) 230 is used between the dispatching client 160 and the dispatching server 172. The CTML 230 may be established over the packet data network 102 during the system setup. The dispatching client 160 routes all trunking messages from BSC 130 through the CTML 230 to the dispatching server 172. In addition, the dispatching server 172 uses the same CTML 230 to send trunking messages back to BSCs 130.

Figure 3:
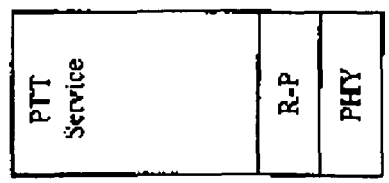
FIG. 3 shows the common trunking message link protocol stacks in the trunking system in FIG. 1 according to one exemplary implementation.
Figure 3:
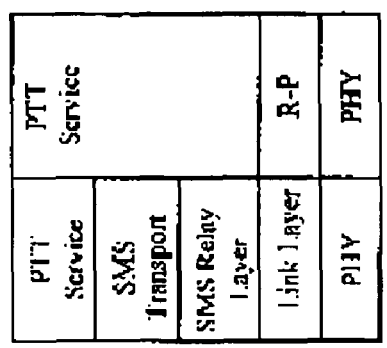
Figure 3:
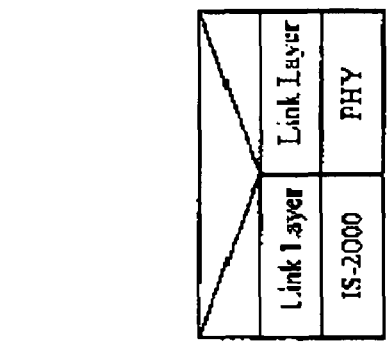
Figure 3:
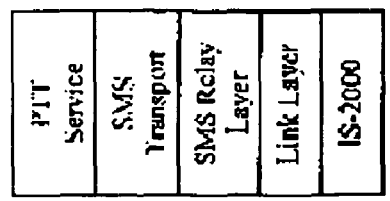

The corresponding trunking message system based on the above links may use the Short Data Burst (SDB) or Short Message Service (SMS) framework. Notably, the present trunking system does not use a PPP (point-to-point protocol) layer in the protocol stack between the dispatching server 172 and the dispatching clients 160 to reduce overhead and to increase the data throughput. Hence, the PPP connection is terminated at each dispatching client 160 and the data packets in the trunking system do not have the PPP headers. FIG. 3 shows the common trunking message link protocol stacks. The basic information trunking message routing includes the category information which defines a new service category for the trunking group calls and address information which has both trunking group addresses for identifying trunking groups and trunking group member addresses for identifying group members. The trunking group address is the field of origination or destination address and is owned and shared by the members within the group. The trunking group member address is owned by the particular group member and is the field of origination or destination sub-address.

A trunking message router may be used to route the trunking messages. This router may be implemented as a control software module for carrying out the routing operations and may be located within the BSC 130. The message routing function in the router can be designed to separate trunking messages using normal SDB format from normal SDB messages based on the service category. The router directs normal SDB messages to the signal connection control part (SCCP) of MSC 140 and trunking messages to the CTML 230 on dispatching client 160.

Figure 4:
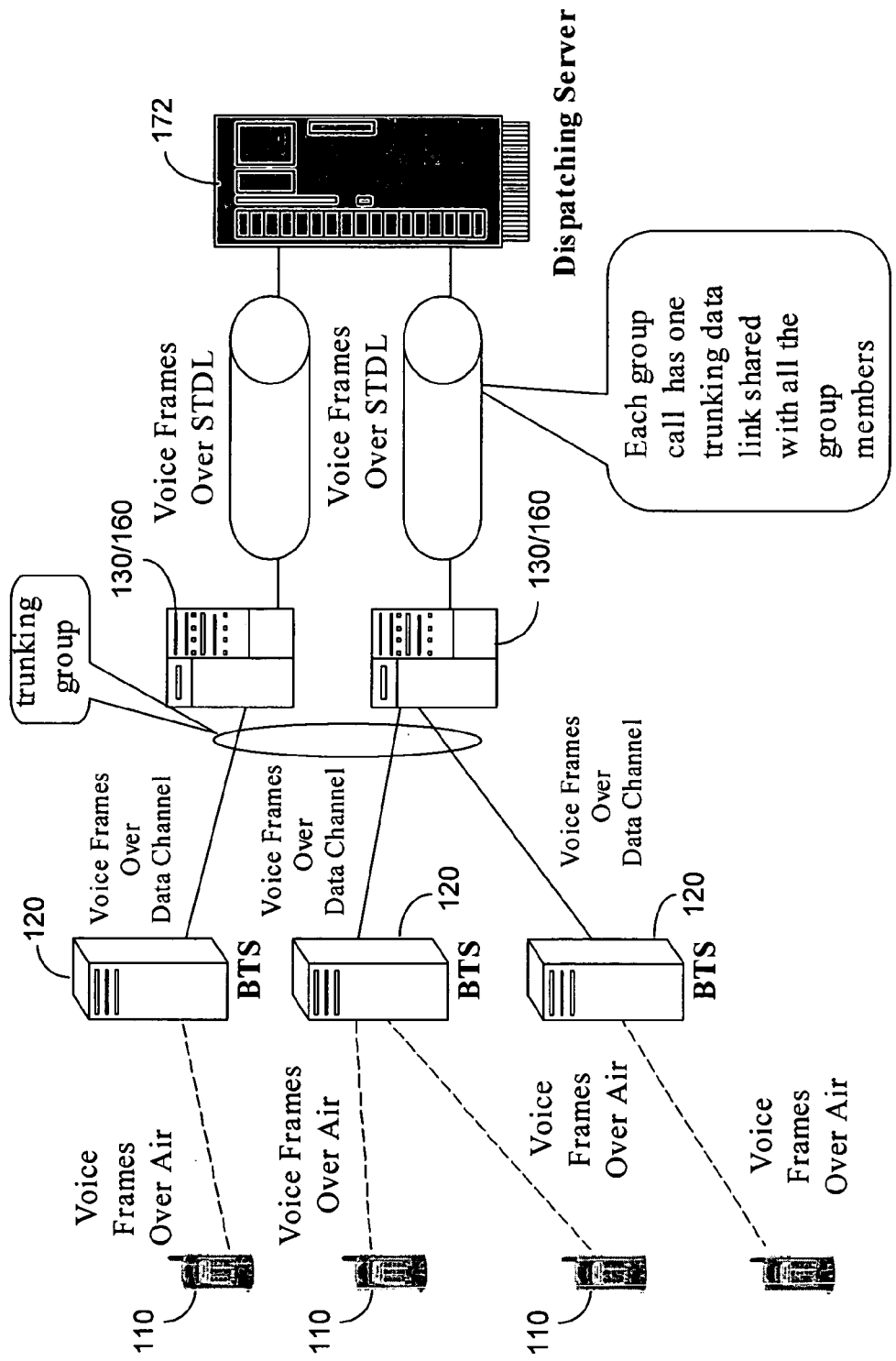
FIG. 4 illustrates the sharing of a trunking data link by all group members in a group call in the system in FIG. 1 according to one exemplary implementation.
Figure 5:
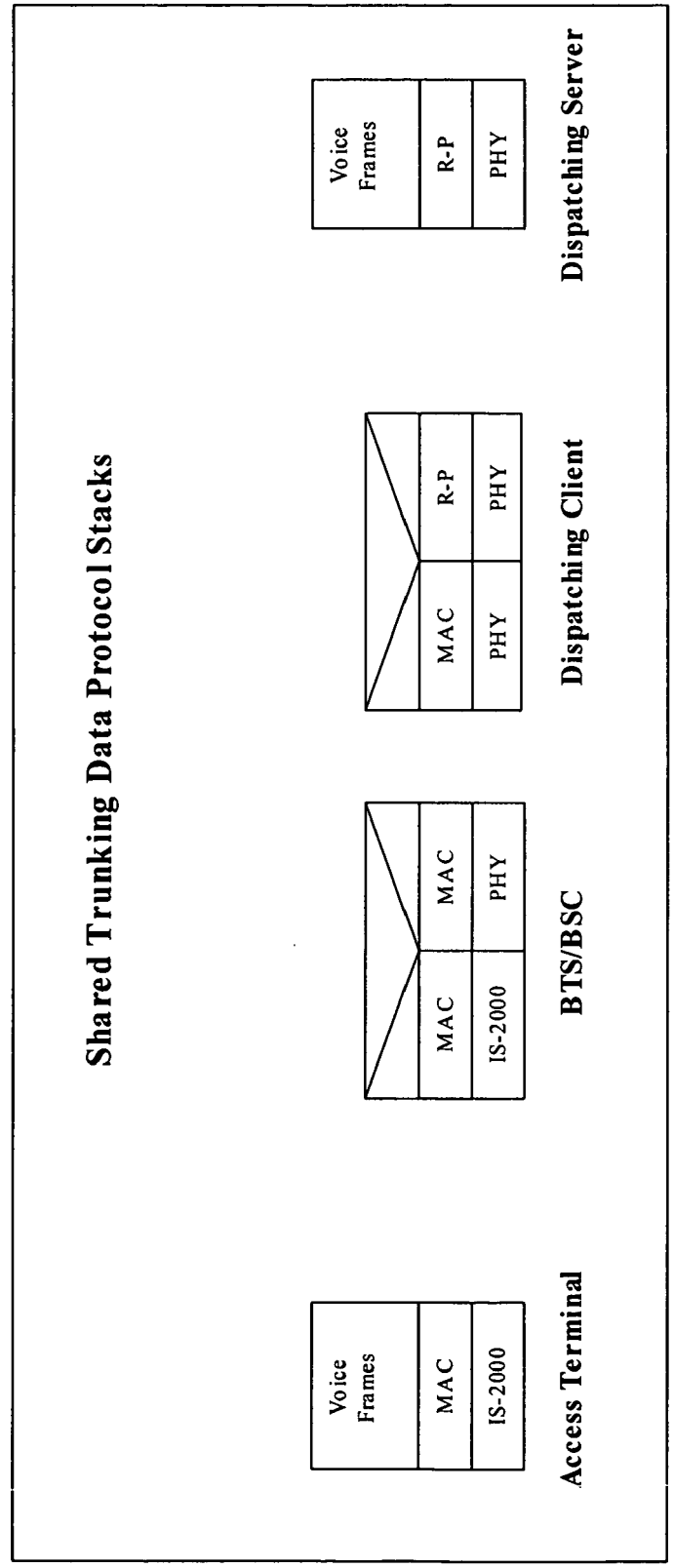
FIG. 5 further illustrates the shared trunking data protocol stacks according to one exemplary implementation.

The routing of the trunking data may be designed to use shared trunking data links (STDLs), where each group call has a single trunking data link between each dispatching client and the dispatching server and shared by all group members. This sharing allows for high efficiency in utilization of system resources and thus increases the system capacity. FIG. 4 illustrates this sharing mechanism. FIG. 5 further illustrates the shared trunking data protocol stacks, where "MAC" is the medium access control layer which is the lower sublayer of the data link layer and operates to use the physical layer (PHY) to provide services to the logical link control.

In this sharing mechanism, each trunking group call is assigned with its own A10/A11 link between the client 160 and the server 172 and each trunking group member has its own A8/A9 link between the BSC 130 and the client 160. The corresponding dispatching client includes a mapping table to map multiple A8 links (N) for the group members to a single A10 link for the group, i.e., an N-to-1 mapping. In operation, when the dispatching client 160 receives voice frames from any A8 link, the control software directs the client 160 to find the associated A10 link for that group and to route frames on that found A10 link. On the other hand, when the client 160 receives voice frames from the sever 172 through an A10 link, the client 160 finds all A8 links of a trunking group associated with the A10 link and distributes the voice frames on all the A8 links. Accordingly, the dispatching server 172 maintains an A10/A11 link lookup table for each trunking group call. When the sever 172 receives voice frames from any A10 link, the lookup table is searched to get all A10 links for the group and then the voice frames are sent to all A10 links in the table.

The system 100 in FIG. 1 can be configured to support two types of trunking groups based on the frequency of change in the group members: permanent groups and temporary groups. Based on the different group characteristics, different control and management mechanisms are used. A permanent trunking group does not change the members frequently based on a predetermined criterion and typically includes talk groups with a large number of members or talk groups for stabilized organizations such as corporations (e.g., taxi companies) and municipal agencies (e.g., police department). The control and management of permanent groups may be designated to the network operators, i.e., the service providers. The network creates and maintains permanent groups by, e.g., assigning a group identification (GID) number to each permanent group for setting up the group calls, and assigning a member as the group head for each permanent group. The group head is authorized to add or remove a group member at any time. This change in the group membership is sent via SDB messages to the group registration database 174 in the dispatching service node 170 shown in FIG. 1. The network operators may be able to maintain the group membership.

By contrast, much flexibility may be given to a temporary trunking group. For example, any subscribed user can use the mobile station to create and maintain a temporary group which is not registered in the group registration database 174. To identify a temporary group call, the network assigns a temporary GID to the temporary group call. Different from the permanent groups, any user can initiate a group call via a SDB message to the server 172, where the SDB message includes a list of phone numbers for the temporary group. In addition, there is no SDB message to the group registration database 174 when a change in the group membership is made.

To implement the trunking system, each user device or mobile station 110 may be designed to include proper circuitry and special trunking software to support the group calls. Each device 110 may include a push-to-talk (PTT) button to activate the group call function. A group call may be set up as follows. First, a mobile user in a trunking group pushes the PTT button to send a Group Call Request message to the dispatching client 160. This request may contain a special service option to distinguish from other services such as the regular calls handled by the MSC 140 or packet data services handled by the PDSN 154. Upon receiving the request from the client 160, the dispatching server 172 pages all group members and brings them on line. At this point, the following traffic channels are established for the group call: one forward dedicated control channel for each group member, one forward common channel shared by all group members of the group, and one reverse dedicated control channel for each group member.

The group call setup makes a fast group call connection which includes a group call paging, parallel authentication, and disablement of the slotted mode during the dormant state. The group call paging, in one aspect, operates to locate and page group members of a group call. The dispatching server 172 receives the location information of group members from the DLS 176 and sends this information in a GroupConnectionRequest message to the dispatching client 160. The client 160 sends ConnectionRequest with member location information to assist BSC 130 to locate and page group members via a SDB message. The ConnectionRequest is then sent to each mobile in the group. In one implementation, the paging channel may check all SDB messages and consolidate the ConnectionRequest messages so that only one ConnectionRequest message is sent out per group per slot.

Another aspect of the group call paging is to disable the slotted mode of each mobile in the trunking group in which the group call is requested. During a normal slotted mode, a mobile's receiver sleeps and wakes up periodically in a slot cycle to check on the paging channel if it is being paged. When the group call will enter dormant state, mobiles in the group call will automatically disable the slotted mode, release traffic channels and enter idle state. But all the STDLs for the group call still remain connected. During dormant state, all the mobiles in the group monitor the paging channel on every paging slot and are able to receive Connection Request message on every paging slot in order to provide fast group call setup.

In general, the trunking system should authenticate a group call. Two kinds of authentication may be provided. First, the GID for the group call is authenticated by the dispatching server 172 and the registration database 174. This operation determines that if all group call users have subscribed to the group call service and checks if group call users belong to the trunking group. If both conditions are satisfied, the group call setup continues. Otherwise, the dispatching server 172 terminates the group call setup and send the Group Call Deny message back to the originator. The second authentication is the parallel authentication executed during the fast group call connection where it authenticates the mobile station registered in the network for the group call. This is done in the MSC 140 as normal voice or data call authentication through a ServiceRequest message during the group member paging by having BSC 130 to send the ServiceRequest to MSC 140.

Next, the group call is carried out. In operation, the dispatching server 172 has an arbitration mechanism to assign priority to requests for group calls and grants only one user to send its data on the reverse link at any time during the group call. This arbitration may be based on a "first-come-first-serve" scheme. Alternatively, certain group members may be given special priority over other group members. Any granted user data on the reverse link is dispatched on the shared forward link to all group members. Hence, after a mobile sends PTT Request Message to the dispatching server, the dispatching server responds by sending a PTT Grant Message to all group members with a Granted Member ID. Upon finishing talking in a group call, the mobile sends a PTT Release Message and is ready to receive user data from others.

A group call can be released by two modes. A normal release can be accomplished only by the group head. The group head sends a group call release message via SDB to the dispatching server 172 which in turn releases all the resources related to the group call. A group call may also be forced to release prior to receiving a release signal from the group such as the group head. For example, a forced release may be executed after the group call remains in the dormant state for a specified period. The dispatching server 172 can force the group call to release when the dormancy timer expires. As another example, the group call may be forced to release when there is a shortage of system resources.

The present system allows for a number of maintenance features during a group call. For example, the group head is allowed to add a new group member during the call. Also, a group member is allowed to join the group call during conversation even if the member could not to join the call during the setup state. Active joining is supported where a registered mobile station of a group can send a message to the dispatching server 172 when the mobile is in service and the server 172 can page the mobile station to join the group call. Passive joining is also supported where the dispatching server 172 periodically pages the absent group members to join the call. A group member can exit a group call early by sending a SDB message to the dispatching server 172. After the exit, the dispatching server 172 will not deliver the group call data to the member who has quit and will not page the mobiles. A group head may also be allowed to quit a call while other members stay on the group call. Furthermore, a group member may also re-join a group call by pushing the PTT button to send a SDB message to the dispatching server.

Billing of group calls may be implemented through the MSC 140. Each group member may be counted separately for the link usage in a group call. The BSC 130 sends a ServiceRequest message to MSC 140 for each group member during the group call setup, where the ServiceRequest message includes a special Service Option for the group call. In addition, the BSC 130 sends a ClearRequest message to MSC 140 if the group call is released or is dormant or a group member quits the group call. The group call billing is done during the post processing in the billing center and may apply different billing rates for group calls than other calls and may apply different group call billing rates for different groups.

The following sections describe features of the group call air interface, including forward traffic channel, reverse traffic channel, handoff, and frame offset.

The forward traffic channels in a group call may include one forward dedicated control channel (F-DCCH) for each trunking group member and one forward supplemental channel (F-SCH) shared by members of a trunking group. The forward channels, both F-DCCH and F-SCH, may use the same common long code sequence for all trunking group members in a group call. Each PTT device in a trunking group has its own Walsh code for F-DCCH and all PTT devices in a trunking group share the same common Walsh Code for F-SCH. The F-DCCH carries the signaling messages for trunking operations and the power control information for each group member. This channel is established during the setup of a group call.

Figure 6:
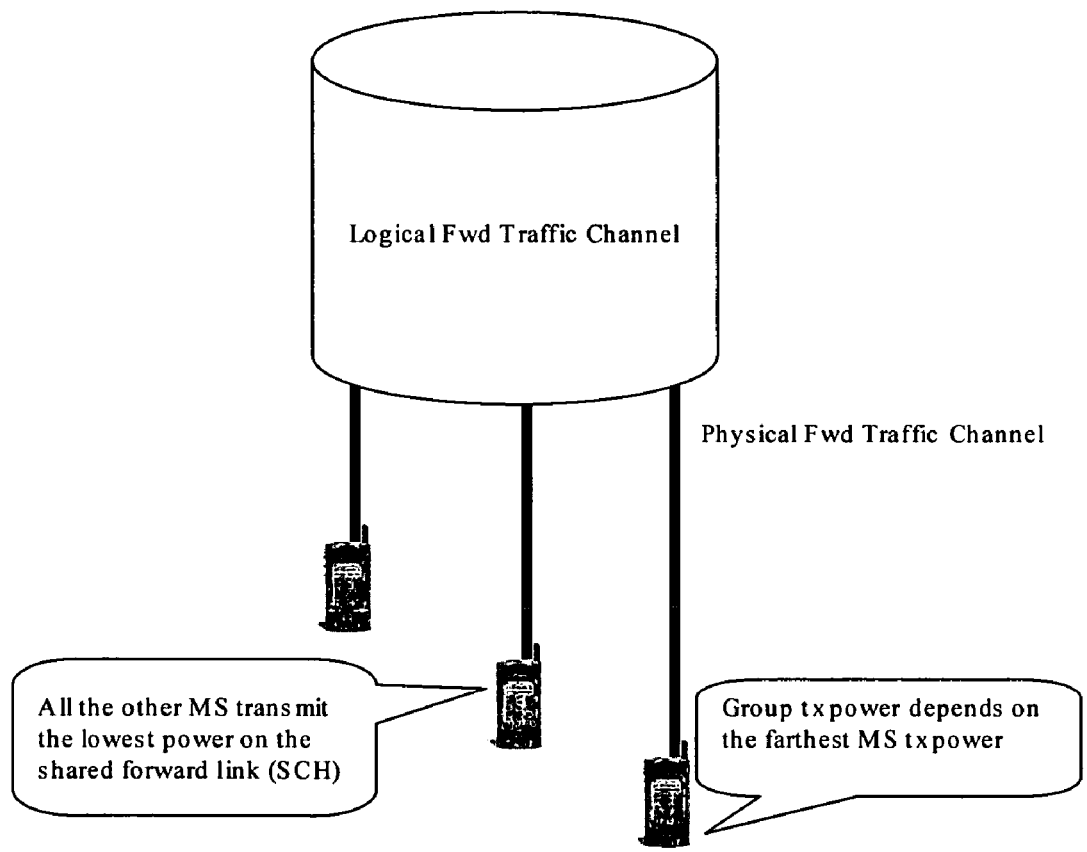
FIG. 6 illustrates the mapping of the physical F-SCH and the logical F-SCH according to one exemplary implementation.

The F-SCH as a physical channel is used to carry user data of group calls. Notably, each member of a trunking group has its own physical forward channel element resources to process forward traffic frames. All the group members share one logical or virtual Forward Supplemental Channel (F-SCH) by using the same common long code sequence and the same common Walsh code in the same sector in the sectorized cell arrangement. The dispatching server is programmed with an arbitration mechanism to manage the use of the F-SCH shared among the group members. FIG. 6 illustrates the mapping of the physical F-SCH and the logical F-SCH. At the radio link control layer, the logical F-SCH is the sum of all physical F-SCHs in the same sector and there is one logical F-SCH per sector. The F-SCH is established when the group call is established. More specifically, the logical F-SCH is established among the group call and physical F-SCH is established for each group member.

One feature of the air interface for the trunking system is to utilize the power control mechanism in the underlying CDMA system to minimize the transmission power on both forward and reverse links. On the forward traffic channel, an individual closed power control loop, the forward link power control (FLPC), is independently applied on each of the F-DCCH and F-SCH. A primary power control channel is used to control the power on the F-DCCH and a secondary power control channel is used for the F-SCH. On the shared F-SCH, a trunking device can receive or combine other users' F-SCH even if its own F-SCH is transmitting at the lowest power level. The closed loop power control is enabled on each physical F-SCH to keep the transmission power at the lowest on the channel element used for a mobile station 110 closer to BTS 120 and to maintain the minimum required transmission power of the channel element for the mobile station 110 that is farthest from its BTS 120. Under this control scheme, the total transmission power on the F-SCH for the group call depends on the transmission power of F-SCH assigned to the farthest mobile station 110. In addition, the outer loop power control is enabled on the forward supplemental channels to maintain the frame error rate within the required range for the CDMA system.

The reverse traffic channel in a group call may be implemented in two different configurations. In the first configuration, a single reversed dedicated control channel (R-DCCH) is assigned to each group member and is used to carry the signaling message, the power control information, and the user traffic. In the second configuration, two reverse traffic channels, a R-DCCH, and a R-SCH, are used. The R-DCCH is used to carry signaling message, and the power control information. The R-SCH is used to carry the user traffic. Similar power control techniques used for the forward channels may be applied here to minimize the transmission power on the reverse link.

Both soft and softer handoffs are supported in the trunking system. All forward and reverse channels are controlled to perform soft and softer handoff together. The handoff operations are configured to comply with CDMA2000 standards (e.g., IS-2000) and to add additional features. One added feature is that all legs involved in soft and softer handoff for a group call use the common long code sequence and a common Walsh code is used by all group members in the same sector for the F-SCH. When a mobile station is in soft or softer handoff with multiple sectors, its forward power control impacts the forward transmission power of the common F-SCH on all sectors. The BTS and BSC are controlled to use an algorithm to calculate the required transmission power on a new F-SCH. The BTS assigns the transmission power on the new physical F-SCH with a value equal to the required transmission power less the current transmission power on the virtual F-SCH in the new sector. If the value is less than zero, a transmission power of zero is assigned. As for the frame offset, all group members in a group use the same frame offset.

In addition to the above channel sharing, the present trunking system further improves the efficiency of utilizing the system resources by implementing a dormancy mechanism. Two timers are used to monitor the group call activities. The first timer is an inactivity timer for monitoring the activity of a data link on the group call. When the inactivity timer expires, the group call is marked as being in a dormant state. At this point, a second timer, a dormancy timer, is started to monitor the dormant group call and to control the group call in the dormant state. When the dormancy timer expires, the group call is completely released from the dormant state. Either one or both of the timers may be configurable. The configurable dormancy timer may be longer than the inactivity timer to ensure quality of service of the group calls.

In one implementation, when there is no data being transmitted over the data link in a group call, the inactivity timer is initiated so that the group call is set from an active state to an inactive state. In the inactive state, the system maintains a minimum transmission power by only transmitting forward and reverse link power control signals and the reverse link pilot while keeping all physical channels alive. When the dormancy timer starts running for a dormant state, the system can be configured to releases at least one and maybe all physical channels from the dormant group call. Hence, when the group call is re-activated from the dormant state, all physical channels need to be setup again if they are all released.

The inactivity timer may be configured to have a desired timer period, e.g., based on the needs of the cellular carriers. The length of this timer represents a tradeoff between the usage of the radio resources and latency of the PTT requests. When the inactivity timer is short, the group call enters dormant state more frequently. This strategy can save the radio resources. However, since the latency is much greater for the first PTT request when the group call is re-activated from dormant state, the average latency is increased. If, on the other hand, a longer inactivity timer is set, the average latency is reduced as the expense of limited radio resource for other group calls and services. On balance, it may be desirable to configure a long time for the inactivity timer to reduce the average latency in setting up a group call. When there is shortage on air link capacity or channel element resources, the radio resource manager/dispatching server may initiate to bypass the long inactivity timer by placing the group call to dormant state prior to expiration of the inactivity timer.

In implementation of above trunking system, the mobile stations, the air interface, and the network interface may be specially configured to meet certain requirements. In the mobile stations, the long code mask registers for the forward traffic and reverse traffic channel may be allowed to configure to different values. The call flow needs to be changed to accommodate group call processing. Each mobile station may support a new service option for the group call which allows the group call voice frames to be transmitted over R-DCCH and received from the F-SCH. As for the network interface, FIG. 1 shows that, in addition to the PCF 152 and PDSN 154 for regular packet data services under various CDMA2000 standards, the present trunking system adds dispatching server 172 and clients 160 to handle group calls via the packet data network 102.

The trunking system is designed to use trunking messages such as group setup messages, group call messages, and PTT messages in SDB format for communication between trunking devices and dispatching clients/servers. The group setup messages include the group member add message (ACH, EACH, R-DCCH) and group member remove message (ACH, EACH, R-DCCH). The group call messages include Group Call Request message (ACH, EACH), Group Call Connection message (PCH), Group Call Release message (F/R-DCCH, PCH, ACH, EACH ), Group Call Deny and Group Member Release message (R-DCCH). The PTT messages include PTT Request (R-DCCH), PTT Granted (F-DCCH), PTT Release (F/R-DCCH), and PTT Release-Ack (F/R-DCCH).

Another desired feature of the trunking system is the voice loop-back avoidance mechanism. During the group call conversation, the originating mobile station may be prevented from receiving its voice data dispatched on the F-SCH. The loop-back data is analogous to an echo and is undesirable in most applications. The originating mobile station uses PTT Release message to indicate to Dispatching Sever the completion of data transferring from the reverse link. The dispatching server uses the reliable delivery of PTT Release-Ack message to notify the originating mobile station when it completes its dispatching the originator's data on F-SCH and it receives PTT Release message from the originating mobile station. The originating MS is allowed to receive other users' data on the F-SCH after it receives the PTT Release-Ack message. The mobile station can start a Loop-back Avoidance timer after sending the PTT Release message. If the timer expires and the PTT Release-Ack is not received, the MS can disable the timer and allow to receive users' data on F-SCH.

Figure 7:
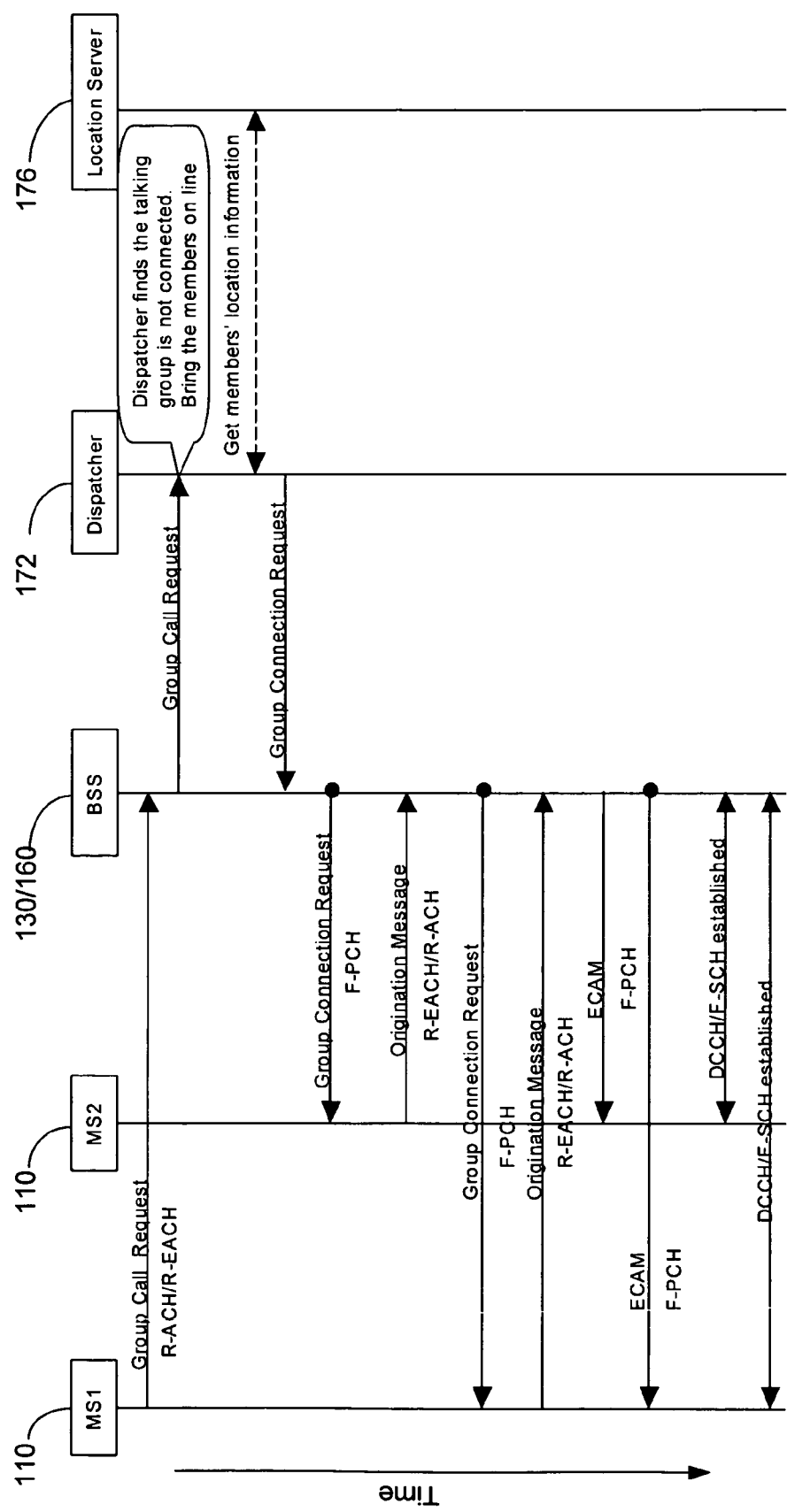
FIGS. 7 and 8 respectively show the operation flows for setting up a group call and for setting up a PTT based on the above trunking system.
Figure 8:
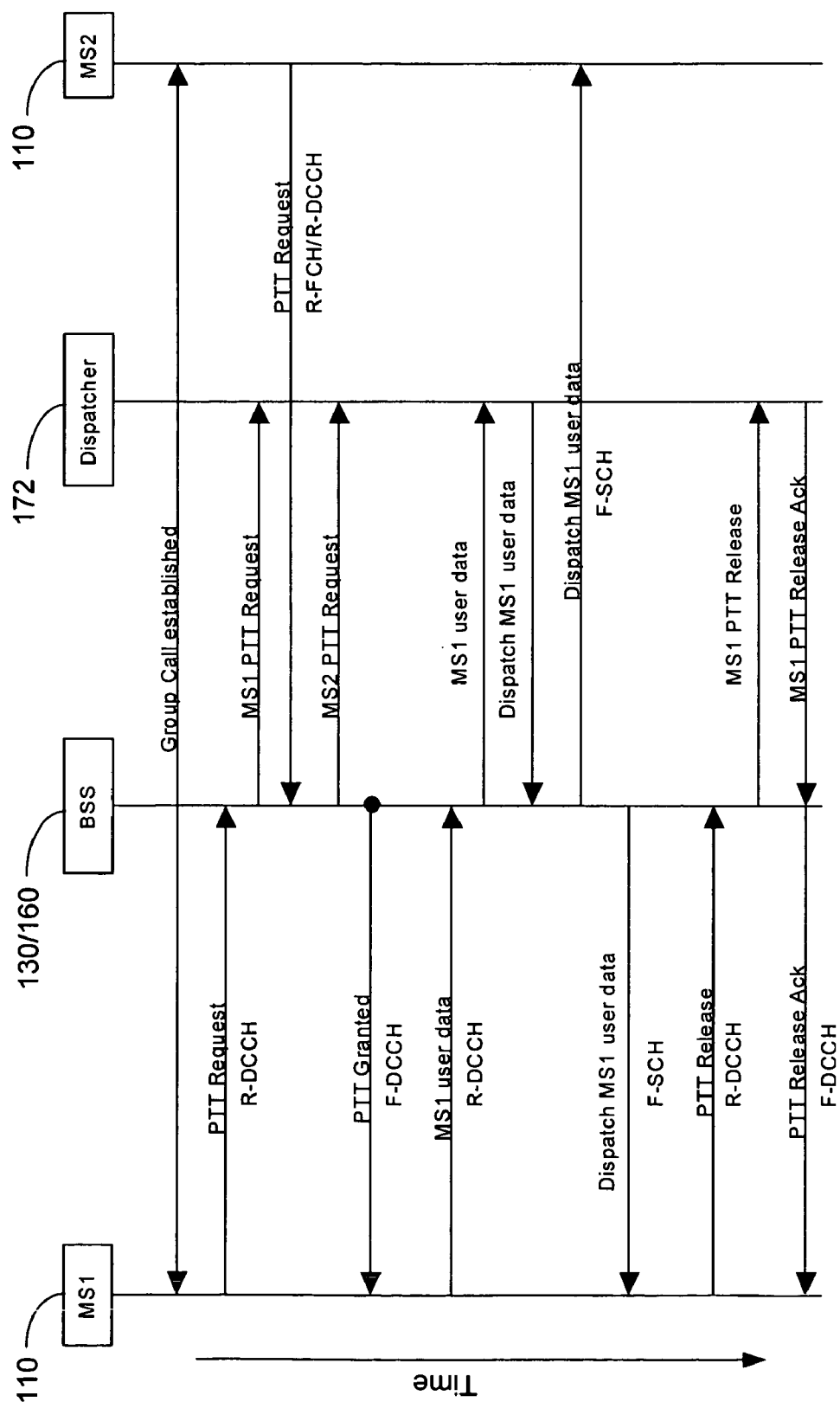

FIGS. 7 and 8 respectively show the operation flows for setting up a group call and for setting up a PTT based on the above trunking system. The arrowed line represents direction of the each communication channel or signal. The text above each arrowed line represents the content or operation of each signal and the text below each arrowed line is the name of the signal or channel. For example, "F-PCH" represents the forward paging channel and "ECAM" represents extended channel assignment message. The control mechanism for the operations in FIGS. 7 and 8 and other control functions may be implemented as machine-readable programming instructions or software modules in storage units at various locations in the system in FIG. 1 to control the hardware devices.

Figure 9:
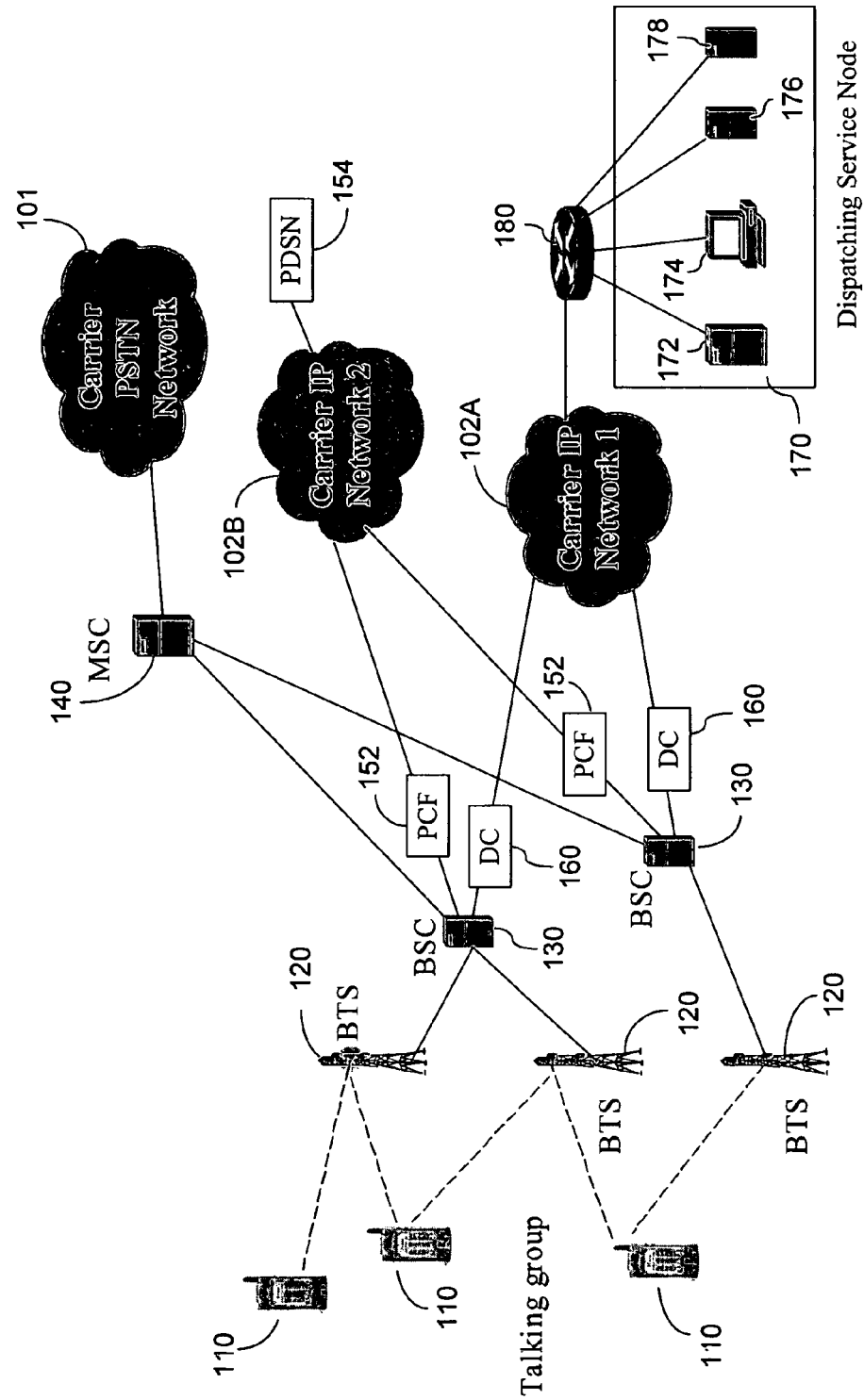
FIG. 9 shows an alternative system architecture for the trunking system in FIG. 1.

In the above trunking system shown in FIG. 1, the PDSN 154 and the dispatching service node 170 are shown to share the same packet data network 102. Under this network configuration, the PTT voice data packets in the trunking system and the data packets for the normal data services are routed through the same network 102. When there is a high traffic in the shared network 102, the quality of service for both normal data services and the PTT services may be adversely affected. FIG. 9, however, illustrates an alternative system architecture where two separate packet data networks 102A and 102B are implemented to eliminate the above sharing. The packet data network 102A, such as an IP network No. 1, is coupled to the dispatching clients 130 and the dispatching service node 170 for handling the data packets for PTT services. The packet data network 102B, such as an IP network No. 2, is coupled to the PCFs 152 and the PDSN 154 for handling the data packets for the normal packet data services. The general operations of the trunking system in FIG. 1 remain essentially unchanged when applied to this system architecture.

Figure 10:
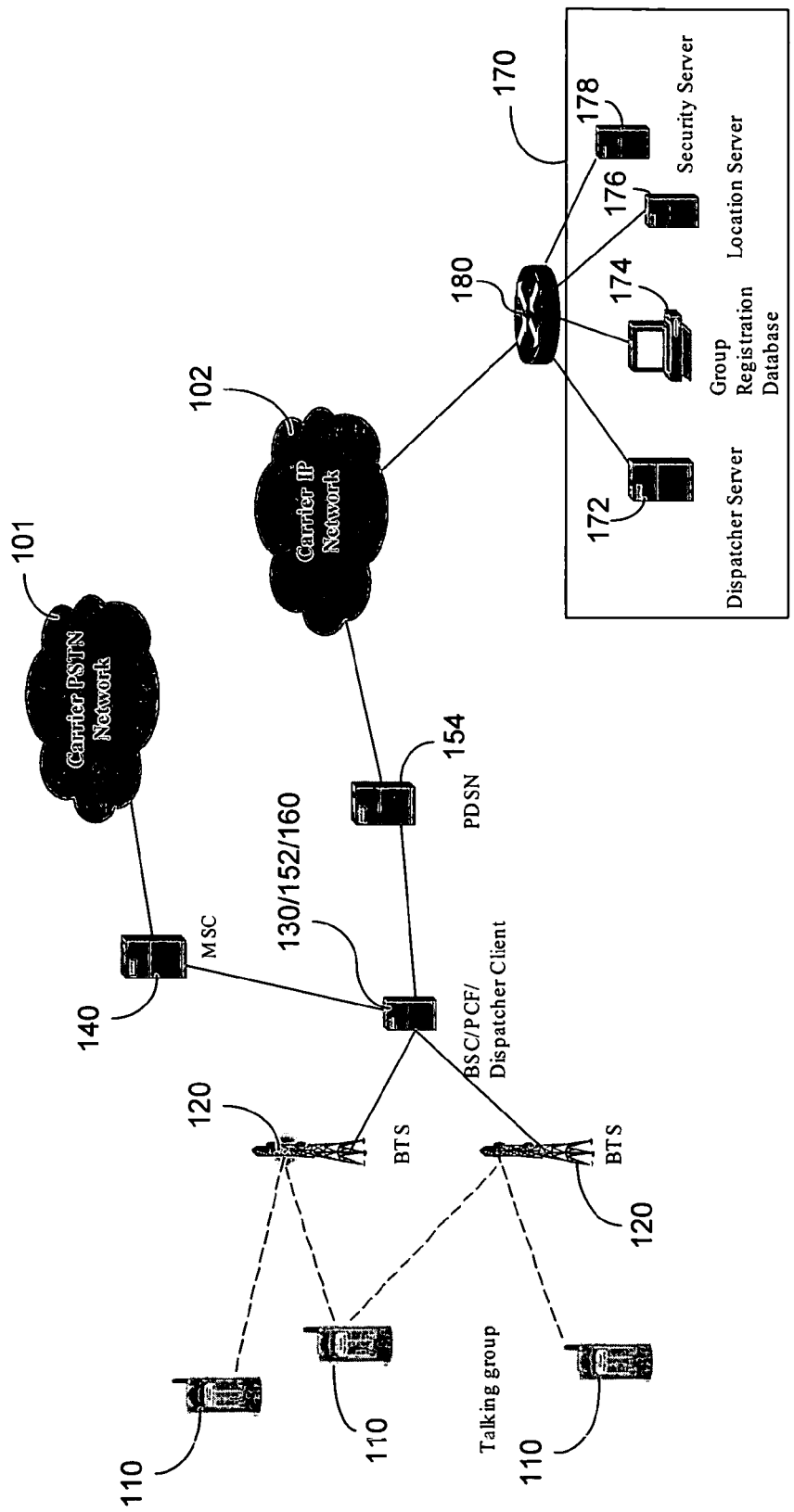
FIG. 10 shows another CDMA system with a different trunking system.

FIG. 10 shows another CDMA system with a different trunking system where the PDSN 154 is connected between the dispatching client 160 and the dispatching service node 170. This system can be controlled to perform similar group call functions as described for the system in FIG. 1. However, since the PDSN 154 is located in the path between the dispatching clients 160 and the dispatching server 172, this may cause additional latency.

In addition, the above trunking systems may be designed to provide "always-on" services for group calls to eliminate initial dialing to the service carrier. Moreover, each dispatching client 160 may be connected to two or more base station controllers 130.

Referring back to FIG. 1A, the illustrated example of a WCDMA system may be configured to use UTRA air interface protocols to implement the trunking and PTT mechanisms. The examples described here are with respect to the UTRA air interface. It is understood that the Iu interface of the Core Network of the UMTS Terrestrial Radio Access Network (UTRAN-CN) may be modified or adopted in accordance with changes in the air interface. The UTRA air interface may be implemented in two different modes: the FDD mode at 5 MHz (CDMA) and the TDD mode at 3.84 Mcps or 1.28 Mcps (CDMA/TDMA). The examples described below use the UTRA FDD mode.

The UTRA FDD includes three layers L1, L2 and L3. The following is an overview of the layers.

The first layer L1 is the physical layer designed to perform a range of functions, including macrodiversity distribution/ combining and soft handover execution, error detection on transport channels and indication to higher layers, FEC encoding/decoding and interleaving/deinterleaving of transport channels, multiplexing of transport channels and demultiplexing of coded composite transport channels, rate matching, mapping of coded composite transport channels on physical channels, power weighting and combining of physical channels, modulation and spreading/demodulation and despreading of physical channels, frequency and time (chip, bit, slot, frame) synchronization, measurements and indication to higher layers (e.g. FER, SIR, interference power, transmit power, etc.), closed-loop power control, and RF processing. Each of the physical channels is defined by one or more scrambling codes and channelization codes. Downlink Physical Channels include common channels and dedicated channels. Examples of common channels include, Common Pilot Channel. (CPICH), Primary Common Control Physical Channel (P-CCPCH), Secondary Common Control Physical Channel (S-CCPCH), Synchronisation Channel (SCH), Physical Downlink Shared Channel (PDSCH), Acquisition Indicator channel (AICH), Access Preamble Acquisition Indicator channel (AP-AICH), Collision Detection Channel Assignment Indicator channel (CD/CA-ICH), Paging Indicator Channel (PICH), CPCH Status Indicator Channel (CSICH), and High Speed Physical Downlink Shared Channel (HS-PDSCH). Examples of the dedicated channels include Downlink Dedicated Physical Channel (downlink DPCH). The uplink physical channels include common channels such as Physical Random Access Channel (PRACH) and Physical Common Packet Channel (PCPCH), dedicated channels such as Dedicated Physical Data Channel (uplink DPDCH), Dedicated Physical Control Channel (uplink DPCCH) and Dedicated Control Channel associated with HS-DSCH transmission (uplink HS-DPCCH).

The physical layer L1 offer services to upper layer through transport channels which can be multiplexed on to the one of more physical channels. The transport-format combination indicator (TFCI) is used to uniquely identify the transport format of each transport channel at each radio frame. Downlink Transport Channels include common channels such as the Broadcast Channel (BCH), the Forward Access Channel (FACH), the Paging Channel (PCH), the Downlink Shared Channel (DSCH), and the High Speed Downlink Shared Channel (HS-DSCH). The Downlink Transport Channels also include a Dedicated Channel (DCH). Uplink Transport Channels include the Dedicated Channel (DCH) and common channels like Random Access Channel (RACH) and Common Packet Channel (CPCH)

The layer L2 includes a number of sublayers: Medium Access Control (MAC) layer, Radio Link Control (RLC) layer, Packet Data Convergence Protocol and Broadcast/Multicast Control Protocol. The MAC layer MAC Layer includes protocols for the following functions: mapping between logical channels and transport channels, selection of appropriate Transport Format for each Transport Channel depending on instantaneous source rate, priority handling between data flows of one UE, priority handling between UEs by means of dynamic scheduling, identification of UEs on common transport channels, multiplexing/demultiplexing of upper layer PDUs into/from transport blocks delivered to/from the physical layer on common transport channels, multiplexing/demultiplexing of upper layer PDUs into/from transport block sets delivered to/from the physical layer on dedicated transport channels, traffic volume measurement, Transport Channel type switching, ciphering, Access Service Class selection for RACH and CPCH transmission, HARQ functionality for HS-DSCH transmission, and in-sequence delivery and assembly/disassembly of higher layer PDUs on HS-DSCH. The MAC layer provides services to RLC layer through various logical channels. Logical channels include control channels such as the downlink Broadcast Control Channel (BCCH), the downlink Paging Control Channel (PCCH), the bi-directional Common Control Channel (CCCH) and the bi-directional Dedicated Control Channel (DCCH), and Traffic Channels such as the downlink/uplink Dedicated Traffic Channel (DTCH) and the downlink/uplink Common Traffic Channel (CTCH).

The RLC layer within the layer L2 includes the following functions: segmentation and reassembly, concatenation, padding, transfer of user data, error correction, in-sequence delivery of upper layer PDUs (Protocol Data Units), duplicate detection, flow control, sequence number check, protocol error detection and recovery, ciphering, and SDU discard. The RLC provides segmentation and retransmission services to upper layer for both user and control data.

The layer L3 includes the Radio Resource Control Protocol (RRC) as the main component of L3. The RRC has the following functions: broadcast of information provided by the non-access stratum (Core Network); broadcast of information related to the access stratum; establishment, re-establishment, maintenance and release of an RRC connection between the UE and UTRAN; establishment, reconfiguration and release of Radio Bearers; assignment, reconfiguration and release of radio resources for the RRC connection; RRC connection mobility functions; Paging/notification; routing of higher layer PDUs; control of requested QoS; UE measurement reporting and control of the reporting; outer loop power control; control of ciphering; arbitration of radio resources on uplink DCH; initial cell selection and re-selection in idle mode and integrity protection.

There are two operational modes for a mobile in the RRC layer: the idle mode and the connected mode. In the idle mode, the mobile is camped on to a cell with no existing RRC connections and is able to receive system information and cell broadcast messages in this mode. A mobile is identified by IMSI (International Mobile Subscriber Identity), TMSI (Temporary Mobile Subscriber Identity) or P-TMSI(Packet-Temporary Mobile Subscriber Identity). The UTRAN has no information on mobile in the Idle mode.

The mobile enters the connected mode when the RRC connection is established. When a RNC has a RRC (Radio Resource Control) connection with a UE (User Equipment), that connected RNC becomes a Serving Radio Network Controller (SRNC) for that UE, handles the user mobility within the UTRAN and is also the point of connection towards the CN (Core Network). In the connected mode, the UE is assigned a radio network temporary identity, e.g., U-RNTI (UTRAN Radio Network Temporary Identifier) and possibly in addition C-RNTI (Cell Radio Network Temporary Identifier) or DSCH-RNTI, to be used as the UE identity on common transport channels. The RRC connection is within a UTRAN identified with the U-RNTI.

The Connected mode is further divided into four states: Cell_DCH, Cell_FACH, Cell_PCH and UTR_PCH. In the state of Cell_DCH, a dedicated physical channel (DCH) is allocated for the mobile. A mobile is known to SRNC on a sector or active set level. The mobile can monitor FACH if it has the capability. Soft handoff can be performed on DCH in this state. In the state of Cell_FACH, no dedicated physical channel is assigned. But user data/signaling messages can be carried by RACH/FACH. Mobile is also capable of monitoring BCH for system information. In this state, mobile continuously monitors the forward link. Cell reselection is performed. After each reselection, a Cell Update message is sent to SRNC. In the state of Cell_PCH, a mobile monitors paging channel and BCH; a mobile is known to it SRNC at cell level but can only be reached via the paging channel; no user data can be transmitted to mobile; and mobile consumes less power since it monitors paging channel with discontinues reception (DRX) functionality. Cell reselection is performed in this state. When a cell reselection is performed, the mobile enters Cell_FACH state to perform Cell Update procedure. The state of URA_PCH is similar to Cell_PCH except a mobile is known by its SRNC at UTRAN registration area (URA). Cell reselection is performed. However, Cell Update procedure is not executed after a reselection. Instead, URA Update procedure is executed when a mobile enters a new URA. Mobile monitors paging channel with DRX functionality.

The above and other features of UTRA FDD are used to support trunking mechanisms and PTT service over UTRA. The implementations are configured to provide fast connection time by reducing origination/paging time during a call setup, to allow a large number of users in a group by providing a resource allocation scheme that maximizes channel/power efficiency and controlling the power consumption, and to provide voice continuity to allow for soft/softer handoff or virtual soft handoff. More specifically, the above and other features may be achieved by using a packet data model for the PTT services, providing two possible channel configurations to implement forward data channel sharing, using different RRC states to reduce the call setup time, using Direct Transfer Message to carry PTT related signaling messages, and adding a new default configuration in UTRA standard for PTT services.

Referring to FIG. 1A, the PTT Service is implemented based on packet data network for UTRAN where the header compression is used and the RLC is in transparent mode for all user data. A comparison of FIG. 1A with FIG. 1 shows that the PTT system architecture for WCDMA is similar to that of CDMA IS-2000 network. For example, the RNC provides all functions of BSC and the Dispatch client, and contains MAC/RLC/RRC protocols; Node B provides all function of BTS and contains PHY protocols. PTT related signaling messages are also the same as the signaling messages in CDMA IS-2000 network. The network configuration in FIGS. 9 and 10 may also be used for WCDMA systems with trunking and PTT mechanisms.

Two different channel configurations, Channel Configuration I and Channel Configuration II, are possible in implementing the WCDMA PTT services.

In the Channel Configuration I, the forward link is configured to include one forward dedicated channel assigned per group member per sector and one forward shared channel by all group members in a sector. In one implementation, the forward dedicated channel assigned per group member per sector has a spreading factor of 256 and carries signaling messages and power control information. The forward shared channel by all group members in a sector has a spreading factor of 128 and carries user data. All group members are told to "listen" to this DSCH continuously in Connection Setup message so that this channel is shared by all group members in a sector. The reverse link in the Channel Configuration I includes a dedicated reverse link channel assigned per group member in a sector with a spreading factor 128. This reverse link DCH carries signaling messages, power control information and user data.

The power control in the Channel Configuration I can be implemented as a closed loop power control which is enabled on the forward/reverse DCH as specified in the UTRA standards. The power control of DSCH is implemented at every frame according the following sequence. In this sequence, for a group member i, the power Ti, which is the transmitted power for forward DCH plus the power offset, is reported at every frame. The power offset is set to be 0 dB when DCH is not in soft handoff, 3 dB when DCH in 2-way soft handoff, and 5 dB when DCH in 3-way soft handoff. The transmit power of DSCH is set to max(T0 . . . Tn) where n is the number of group members in a sector.

The handoff in the Channel Configuration I includes soft handoff and fast handoff. The soft handoff is performed on forward/reverse DCH. The fast handoff is performed on DSCH. In performing a fast handoff, the data is distributed to all sectors that are in the active set of DCH (soft handoff sectors). Each data frame carries a frame sequence number derived from system time that allows data synchronization among sectors in the active set. Only one cell in the active set transmits DSCH (serving sector). Periodically, mobile reports Ec/No measurement for CPICH of each sector in the active set. When the Ec/No of the serving sector is lower than that of another sector by a threshold, the RNC triggers a fast handoff. During a fast handoff, RNC informs the target sector to start transmitting DSCH and also informs mobile to listen to DSCH of the new target sector. RNC also terminates the DSCH on the serving sector if there is no more group member in that sector listening to the DSCH. If more than one cell in the active set are transmitting DSCHs, mobile can combine the DSCHs using Maximum Ratio Combining. This is not currently supported in the UTRA standards. To implement this, the physical layer and signaling messages need to be changed and modified.

Figure 11:
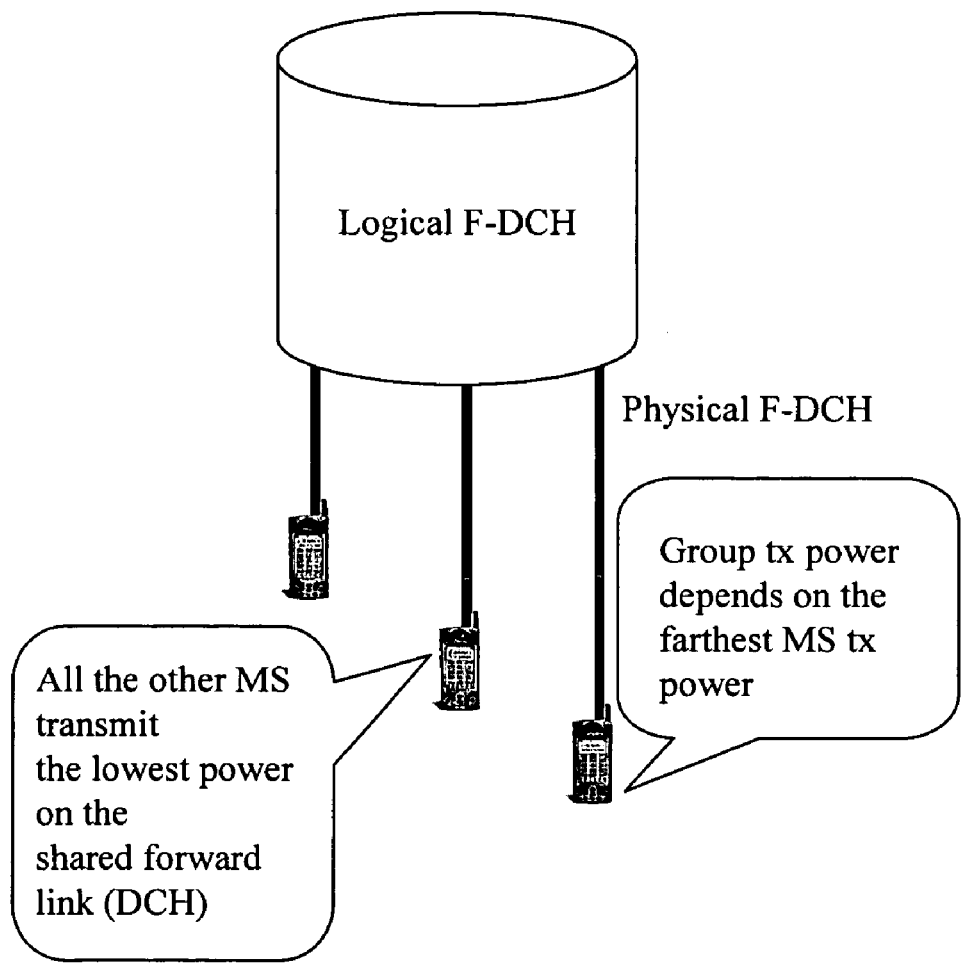
FIG. 11 shows the mapping of the logical F-DCH and the physical F-DCH in one implementation of WCDMA PTT services.

In the Channel Configuration II, the forward link includes one forward broadcast channel shared by all group members in a sector, one forward dedicated channel shared by all group members in a sector and one or more common power control channels shared by group members. The forward broadcast channel includes a Forward Access Channel (FACH) with a spreading factor of 128 and carries all signaling messages including the upper layer PTT signaling and L3 signaling related to the forward dedicated channel. A message is addressed to a mobile by including U_RANI (an assigned identifier) in the MAC header. The forward dedicated channel has a spreading factor of 128 and carries all user data. A common channelization code is assigned to the F-DCH for a group in a sector. The TPC (Transmit Power Control) bits are not transmitted on the F-DCH. One F-DCH is assigned per group member physically. Logically, one F-DCH per group per sector since the mobile station (MS) receives the combined power of all F-DCHs with the common channelization code. FIG. 11 shows the mapping of the logical F-DCH and the physical F-DCH.

A Common Power Control Channel in the Channel Configuration II is currently not defined in the UTRA standards. This channel is used to carry power control information for the reverse link (TPC bits) and can be implemented using a Secondary CCPCH (same physical channel carrying FACH). A secondary CCPCH with a spreading factor of 128 can carry up to 40 bits per slot. As an example, if the reverse link power control is done at every slot, each secondary CCPCH can carry TPC bits for 40 mobiles.

In the Channel Configuration II, the reverse link includes one dedicated reverse link channel assigned per group member in a sector. This channel has a spreading factor of 128 and carries signaling messages, power control information and user data.

No handoff is performed on FACH in the Channel Configuration II. All signaling messages are broadcasted to FACHs of each sector in the mobile's active set. Mobile can receive the messages from any one of the FACHs. Soft handoff is performed on the forward/reverse DCH. No handoff is performed on common power control channel.

In the Channel Configuration II, both the forward link and the reverse link are used to implement the power control. The Fast power control on F-DCH can be implemented by enabling a closed loop power control on each physical F-DCH. The closed loop power control keeps the lowest transmit power on F-DCH used for MS closer to BTS, i.e. power down decision and maintains the minimum required transmit power of F-DCH for the farthest MS from BTS. The total forward link transmit power for the group call depends on the transmit power of F-DCH assigned to the farthest MS. In the forward link, no power control is done on FACH which can transmit at a fixed power level. Each common power control channel is not implemented with the power control and thus can transmit at a fixed power level. The power ocntorl on the reverse link is a closed loop power control on R-DCH. Each R-DCH performs power adjustment based on the TPC bits obtained from the common power control channel.

The fast connection time in PTT services can be achieved by PTT mobile initialization and fast reconnection mechanisms. The PTT mobile initialization mechanism sets up the RRC signaling connection and enters Cell_PCH state of connected mode when a PTT mobile is powered on. In Cell_PCH state, the PTT mobile is known to the RNC at the cell level. In this state, the PTT mobile monitors the paging channel with Discontinuous Reception (DRX) so that mobile does not have to continuously monitor the paging channels. A DRX cycle length for a PTT mobile is minimized and can be set at, e.g., 8 or 16 frames (80 ms or 160 ms).

The Fast Reconnection mechanism can be implemented as follows. When a group call is released, a PTT mobile exits Cell_DCH state and enters Cell_FACH. Upon entry of the Cell_FACH state, a Fast Reconnection Timer is started. In Cell_FACH, the PTT mobile continuously monitors forward channels (FACH/BCCH) without DRX. This enables a fast reconnect if the mobile is paged again. When the Fast Reconnection Timer expires, the PTT mobile exits Cell_FACH state and enters Cell_PCH state. In Cell_PCH state, the mobile monitors paging channel with DRX. The value of Fast Reconnection Timer is a configurable parameter. If the connection time is critical to the system, then a long timer value can be used. A long timer value can shorten the battery standby time of the mobile.

Only a few implementations are described. Other variations, modifications, and enhancements are possible.

What is claimed is what is described and illustrated, including:

1. A method for providing group calls and sharing communication channels in the group calls in a wideband code division multiple access (WCDMA) wireless communication system based on Universal Terrestrial Radio Access (UTRA) Frequency Division Duplex (FDD), comprising:
   providing in the WCDMA system a group call mechanism that includes a group identification number for identifying a group of members for a group call from one member to other members of the group, group member identification numbers for identifying respective members of the group, and member location information on locations of respective members in the WCDMA system;
   using the group identification number and group member identification numbers to (1) provide sharing of a channel resource members of a group during a group call and (2) screen out sharing of the channel resource by other users subscribed to the WCDMA system;
   assigning one forward dedicated channel (DCH) per group member, located in a sector associated with a base station, in a group of members associated with a group call to carry signaling messages associated with the group call and power control information;
   having all group members in the sector to share one forward dedicated shared channel (DSCH) to carry user data associated with the group call; and
   controlling a plurality of mobile stations associated with the group call, upon release of the group call, to continuously monitor one or more forward channels without using discontinuous reception during a timer period to effect a reconnect to the group call if the plurality of mobile stations are paged during the timer period; and
   controlling the plurality of mobile stations, upon an expiration of the timer period, to monitor a paging channel with discontinuous reception.

2. The method as in claim 1, further comprising using a Connection Setup message to ask all group members to listen to the DSCH continuously.

3. The method as in claim 1, further comprising assigning one reverse link dedicated channel per group member in a sector to carry signaling messages, power control information and user data.

4. The method as in claim 1, further comprising using a packet data network to support push-to-talk (PTT) calls in group calls.

5. The method as in claim 4, further comprising applying a header compression in a PTT call.

6. The method as in claim 5, further comprising setting a radio link control protocol (RLC) for a push-to-talk (PTT) call in a transparent mode.

7. The method as in claim 1, further comprising shortening a discontinuous reception (DRX) cycle when a push-to-talk (PTT) mobile is powered on.

8. The method as in claim 7, further comprising setting up radio resource control signaling connection and entering Cell_PCH state in a connected mode when the PTT mobile is powered on.

9. The method as in claim 7, further comprising controlling the PTT mobile in a Cell_PCH state to monitor a paging channel with DRX.

10. The method as in claim 1, further comprising shortening a discontinuous reception (DRX) cycle when a push-to-talk (PTT) call on a PTT mobile is released.

11. The method as in claim 10, further comprising controlling the PTT mobile to exit a Cell_DCH state and enter a Cell_FACH state when the PTT call is released.

12. The method as in claim 11, further comprising starting a Fast Reconnection Timer when the PTT call is released.

13. The method as in claim 12, further comprising controlling the PTT mobile to monitor a Forward Access Channel (FACH) and a Broadcast Control Channel (BCCH) in the Cell_FACH state without DRX.

14. The method as in claim 13, further comprising controlling the PTT mobile, after the Fast Reconnection Timer expires, to exit the Cell_FACH state and to enter a Cell_PCH state to monitor a paging channel with DRX.

15. The method as in claim 14, further comprising setting the Fast Reconnection Timer to be configurable.

16. The method as in claim 1, further comprising using a dispatcher server or a push-to-talk (PTT) mobile to generate PTT related signaling messages.

17. A method for providing group calls and sharing communication channels in the group calls in a wideband code division multiple access (WCDMA) wireless communication system based on Universal Terrestrial Radio Access (UTRA) Frequency Division Duplex (FDD), comprising:
  providing in the WCDMA system a group call mechanism that includes a group identification number for identifying a group of members for a group call from one member to other members of the group , group member identification numbers for identifying respective members of the group, and member location information on locations of respective members in the WCDMA system;
  using the group identification number and group member identification numbers to (1) provide sharing of a channel resource members of a group during a group call and (2) screen out sharing of the channel resource by other users subscribed to the WCDMA system;
  assigning one forward broadcast channel to be shared by all group members, located in a sector associated with a base station, that are associated with a group call to carry signaling messages associated with the group call;
  assigning one forward dedicated channel (DCH) to be shared by all group members in the sector that are associated with the group call to carry user data associated with the group call;
  assigning at least one common power control channel to be shared by all group members in the sector that are associated with the group call to carry power control information; and
  controlling a plurality of mobile stations associated with the group call, upon release of the group call, to continuously monitor one or more forward channels without using discontinuous reception during a timer period to effect a reconnect to the group call if the plurality of mobile stations are paged during the timer period; and
  controlling the plurality of mobile stations, upon an expiration of the timer period, to monitor a paging channel with discontinuous reception.

18. The method as in claim 17, wherein the forward broadcast channel includes a message addressed to the mobile station, the message includes an identifier, which is assigned to the mobile station, in a medium access control (MAC) header.

19. The method as in claim 17, wherein the forward dedicated channel (DCH) is shared by all group member in a group per sector to carry user traffic.

20. The method as in claim 19, wherein each group member has its own physical forward dedicated channel which is shared by assigning a common channelisation code to all forward dedicated channels in a group per sector.

21. The method as in claim 17, wherein the forward dedicated channel does not transmit one or more Transmit Power Control (TPC) bits.

22. The method as in claim 17, further comprising using the common power control channel to carry power control information for a reverse link, wherein the power control information comprises one or more Transmit Power Control bits (TPC bits).

23. The method as in claim 17, further comprising using a Secondary Common Control Physical Channel (CCPCH) as the common power control channel.

24. The method as in claim 17, further comprising assigning one reverse link dedicated channel per group member in a sector to carry signaling messages, power control information and user data.

25. The method as in claim 17, further comprising using a packet data network to support push-to-talk (PTT) calls in group calls.

26. The method as in claim 25, further comprising applying a header compression in a PTT call.

27. The method as in claim 26, further comprising setting a radio link control protocol for a PTT call in a transparent mode.

28. The method as in claim 17, further comprising shortening a discontinuous reception (DRX) cycle when a push-to-talk (PTT) mobile is powered on.

29. The method as in claim 28, further comprising setting up radio resource control signaling connection and entering a Cell_PCH state in a connected mode when the PTT mobile is powered on.

30. The method as in claim 28, further comprising controlling the PTT mobile in a Cell_PCH state to monitor a paging channel with DRX.

31. The method as in claim 17, further comprising shortening a discontinuous reception (DRX) cycle when a push-to-talk (PTT) call on a PTT mobile is released.

32. The method as in claim 31, further comprising controlling the PTT mobile to exit a Cell_DCH state and enter a Cell_FACH state when the PTT call is released.

33. The method as in claim 32, further comprising starting a Fast Reconnection Timer when the PTT call is released.

34. The method as in claim 33, further comprising controlling the PTT mobile to monitor the FACH and a Broadcast Control Channel (BCCH) in the Cell_FACH state without DRX.

35. The method as in claim 34, further comprising controlling the PTT mobile, after the Fast Reconnection Timer expires, to exit the Cell_FACH state and to enter a Cell_PCH state to monitor a paging channel with DRX.

36. The method as in claim 35, further comprising setting the Fast Reconnection Timer to be configurable.

37. The method as in claim 17, further comprising using a dispatcher server or a push-to-talk (PTT) mobile to generate PTT related signaling messages.

38. The method as in claim 17, further comprising using a Direct Transfer message to deliver signaling messages.

39. The method as in claim 17, wherein the forward broadcast channel includes a Forward Access Channel (FACH).

40. The method as in claim 17, further comprising:
  transmitting a message in the forward broadcast channel addressed to a mobile station, wherein the message is addressed to the mobile station by including an assigned identifier in a medium access control (MAC) header.

* * * * *